(12) United States Patent
Yun et al.

(10) Patent No.: US 12,183,996 B2
(45) Date of Patent: Dec. 31, 2024

(54) ELECTRONIC DEVICE INCLUDING ANTENNA

(71) Applicant: Samsung Electronics Co., Ltd., Suwon-si (KR)

(72) Inventors: Sumin Yun, Suwon-si (KR); Soonheung Kwon, Suwon-si (KR); Hosaeng Kim, Suwon-si (KR); Hyungjoo Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 135 days.

(21) Appl. No.: 18/173,337

(22) Filed: Feb. 23, 2023

(65) Prior Publication Data
US 2023/0223695 A1    Jul. 13, 2023

Related U.S. Application Data

(63) Continuation of application No. PCT/KR2023/000587, filed on Jan. 12, 2023.

(30) Foreign Application Priority Data

Jan. 12, 2022  (KR) .......... 10-2022-0004744
Feb. 18, 2022  (KR) .......... 10-2022-0021601

(51) Int. Cl.
*H01Q 9/04*    (2006.01)
*H01Q 1/24*    (2006.01)

(52) U.S. Cl.
CPC .......... *H01Q 9/0407* (2013.01); *H01Q 1/243* (2013.01)

(58) Field of Classification Search
CPC ........ H01Q 9/0407; H01Q 1/243; H01Q 5/25; H01Q 9/0435; H01Q 21/065; H01Q 25/001
See application file for complete search history.

(56) References Cited

U.S. PATENT DOCUMENTS 7,705,782 B2 *   4/2010  Lee .............. H01Q 21/065
                                              333/116
9,843,108 B2    12/2017  Le et al.
(Continued)

FOREIGN PATENT DOCUMENTS

CN    113013596 A      6/2021
EP     4068509 A1 *  10/2022  ............ H01Q 1/246
(Continued)

OTHER PUBLICATIONS

International Search Report with Written Opinion and English translation dated Apr. 28, 2023; International Appln. No. PCT/KR2023/000587.

*Primary Examiner* — Seung H Lee
(74) *Attorney, Agent, or Firm* — Jefferson IP Law, LLP

(57) ABSTRACT

An electronic device is provided. The electronic device includes a first conductive patch, a second conductive patch, a third conductive patch, and a wireless communication circuit. The first conductive patch includes a first edge facing the second conductive patch, a second edge perpendicularly meeting the first edge at a first corner, a third edge parallel to the first edge, and a fourth edge that is parallel to the second edge and perpendicularly meets the third edge at a second corner. The second conductive patch and the third conductive patch each have a shape identical to that of the first conductive patch. The wireless communication circuit feed power to a first point of the first edge, a second point of a fifth edge of the second conductive patch, and a third point of a sixth edge of the third conductive patch.

20 Claims, 22 Drawing Sheets

(56) References Cited

U.S. PATENT DOCUMENTS

| | | |
|---|---|---|
| 11,095,017 B2 | 8/2021 | Cooper et al. |
| 11,223,141 B2* | 1/2022 | Liu ..................... H01Q 21/061 |
| 11,349,204 B2* | 5/2022 | Wu ....................... H01Q 1/523 |
| 11,355,867 B2 | 6/2022 | Oshima |
| 11,431,110 B2* | 8/2022 | Aviv ..................... H01Q 1/243 |
| 2009/0284440 A1 | 11/2009 | Weidmann et al. |
| 2016/0190696 A1 | 6/2016 | Preradovic et al. |
| 2019/0165476 A1* | 5/2019 | Hong ................... H01Q 21/065 |
| 2020/0076078 A1 | 3/2020 | Tehran et al. |
| 2021/0320417 A1 | 10/2021 | Lee et al. |

FOREIGN PATENT DOCUMENTS

| | | |
|---|---|---|
| KR | 10-2008-0108802 A | 12/2008 |
| KR | 10-1470914 B1 | 12/2014 |
| KR | 10-2019-0090952 A | 8/2019 |
| KR | 10-2297084 B1 | 9/2021 |
| KR | 10-2021-0125345 A | 10/2021 |
| KR | 10-2021-0158199 A | 12/2021 |
| KR | 10-2023-0023905 A | 2/2023 |

* cited by examiner

φ=0°     φ=45°     φ=90°     φ=135°

ELECTRONIC DEVICE INCLUDING ANTENNA

CROSS-REFERENCE TO RELATED APPLICATION(S)

This application is a continuation application, claiming priority under § 365(c), of an International application No. PCT/KR2023/000587, filed on Jan. 12, 2023, which is based on and claims the benefit of a Korean patent application number 10-2022-0004744, filed on Jan. 12, 2022, in the Korean Intellectual Property Office, and of a Korean patent application number 10-2022-0021601, filed on Feb. 18, 2022, in the Korean Intellectual Property Office the disclosure of each of which is incorporated by reference herein in its entirety.

TECHNICAL FIELD

The disclosure relates to an electronic device including an antenna. More particularly, the disclosure relates to an electronic device that feeds power to points of a plurality of conductive patches, which satisfy respective designated conditions, thereby substantially aligning the directions of linearly polarized waves and circularly polarized waves generated from each of the plurality of conductive patches.

BACKGROUND ART

Electronic devices may provide various services to a user through the development of the wireless communication system, and various solutions for effectively providing these services have been being developed. For example, a ranging technology for measuring the distance between electronic devices by using ultra-wideband (UWB) may be used. The UWB technology is a wireless communication technology using a very wide frequency band having several gigahertz (GHz) or higher in a baseband band without using radio carriers.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may transmit and/or receive a signal, based on a linearly polarized wave and/or a circularly polarized wave in a case of UWB communication. For example, the electronic device may transmit and/or receive a signal, based on a first linearly polarized wave having a first direction, a second linearly polarized wave having a second direction, and a circularly polarized wave which are generated from a conductive patch.

The electronic device may use a plurality of conductive patches in a case of performing UWB communication. The directions of linearly polarized waves and/or circularly polarized waves generated from the plurality of conductive patches used in the UWB communication may be different from each other according to the shape, the orientation, and/or the feeding position of the plurality of conductive patches. For example, circularly polarized waves generated from a first conductive patch and a second conductive patch are the same, that is, waves of right-handed circular polarization (RHCP), but the directions of linearly polarized waves generated from the first conductive patch and the second conductive patch may be different. In case that linearly polarized waves of the plurality of conductive patches used in the UWB communication are different from each other, the UWB communication performance of the electronic device may deteriorate.

Aspects of the disclosure are to address at least the above-mentioned problems and/or disadvantages and to provide at least the advantages described below. Accordingly, an aspect of the disclosure is to provide an electronic device that feeds power to points of a plurality of conductive patches, which satisfy respective designated conditions, thereby substantially aligning the directions of linearly polarized waves and circularly polarized waves generated from each of the plurality of conductive patches.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a plurality of conductive patches including a first conductive patch, a second conductive patch disposed to be spaced apart from the first conductive patch along a first axis, and a third conductive patch disposed to be spaced apart from the second conductive patch along a second axis, and a wireless communication circuit positioned in a direction crossing between the first conductive patch and the third conductive patch from the second conductive patch. The first conductive patch may include a first edge facing the second conductive patch, a second edge perpendicularly meeting the first edge at a first corner, a third edge parallel to the first edge, and a fourth edge that is parallel to the second edge and perpendicularly meets the third edge at a second corner. The first conductive patch may have a first width in a first direction from the first corner to the second corner. The first conductive patch may have a second width smaller than the first width in a second direction perpendicular to the first direction. The second conductive patch and the third conductive patch may each have a shape substantially identical to that of the first conductive patch. The wireless communication circuit may be configured to feed power to a first point of the first edge of the first conductive patch, a second point of a fifth edge of the second conductive patch facing the first edge, and a third point of a sixth edge of the third conductive patch relatively adjacent to the first conductive patch among edges of the third conductive patch parallel to the fifth edge. The wireless communication circuit may be configured to transmit and/or receive a signal having a first frequency band through linearly polarized waves generated in an identical direction and circularly polarized waves generated in an identical direction from each of the plurality of conductive patches according to the feeding.

In accordance with another aspect of the disclosure, an electronic device is provided. The electronic device includes a plurality of conductive patches including a first conductive patch, a second conductive patch disposed to be spaced apart from the first conductive patch along a first axis, and a third conductive patch disposed to be spaced apart from the second conductive patch along a second axis, and a wireless communication circuit positioned in a direction crossing between the first conductive patch and the third conductive patch from the second conductive patch. The first conductive patch may have a quadrangular shape. The first conductive patch may include a first edge facing the second conductive patch, a second edge perpendicularly meeting the first edge at a first corner, and a third edge perpendicularly meeting the first edge at a second corner. The first conductive patch may include a first slit structure. The first slit structure may include a first part extending, by a first length, from a first point adjacent to the first corner in a first direction diagonal to the first corner, a second part extending, by the first length, from a second point adjacent to the first corner in the first direction, and a third part connecting the first part and the second part. The second conductive patch and the third conductive patch may each have a shape substantially identical to that of the first conductive patch and may be disposed to be rotated by 180 degrees with respect to the first conductive patch. The wireless communication circuit may be configured to feed power to the first edge of the first conductive patch, a fourth edge of the second conductive patch facing the first edge, and a fifth edge of the third conductive patch adjacent to the first conductive patch among edges of the third conductive patch parallel to the fourth edge. The wireless communication circuit may be configured to transmit and/or receive a signal having a first frequency band through linearly polarized waves generated in an identical direction and circularly polarized waves generated in an identical direction from each of the plurality of conductive patches according to the feeding.

Advantageous Effects

According to an embodiment of the disclosure, an electronic device may align the directions of linearly polarized waves and/or the directions of circularly polarized waves generated from each of the plurality of conductive patches, thereby reducing and/or preventing degradation of UWM communication performance.

Various other advantageous effects identified explicitly or implicitly through this document may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
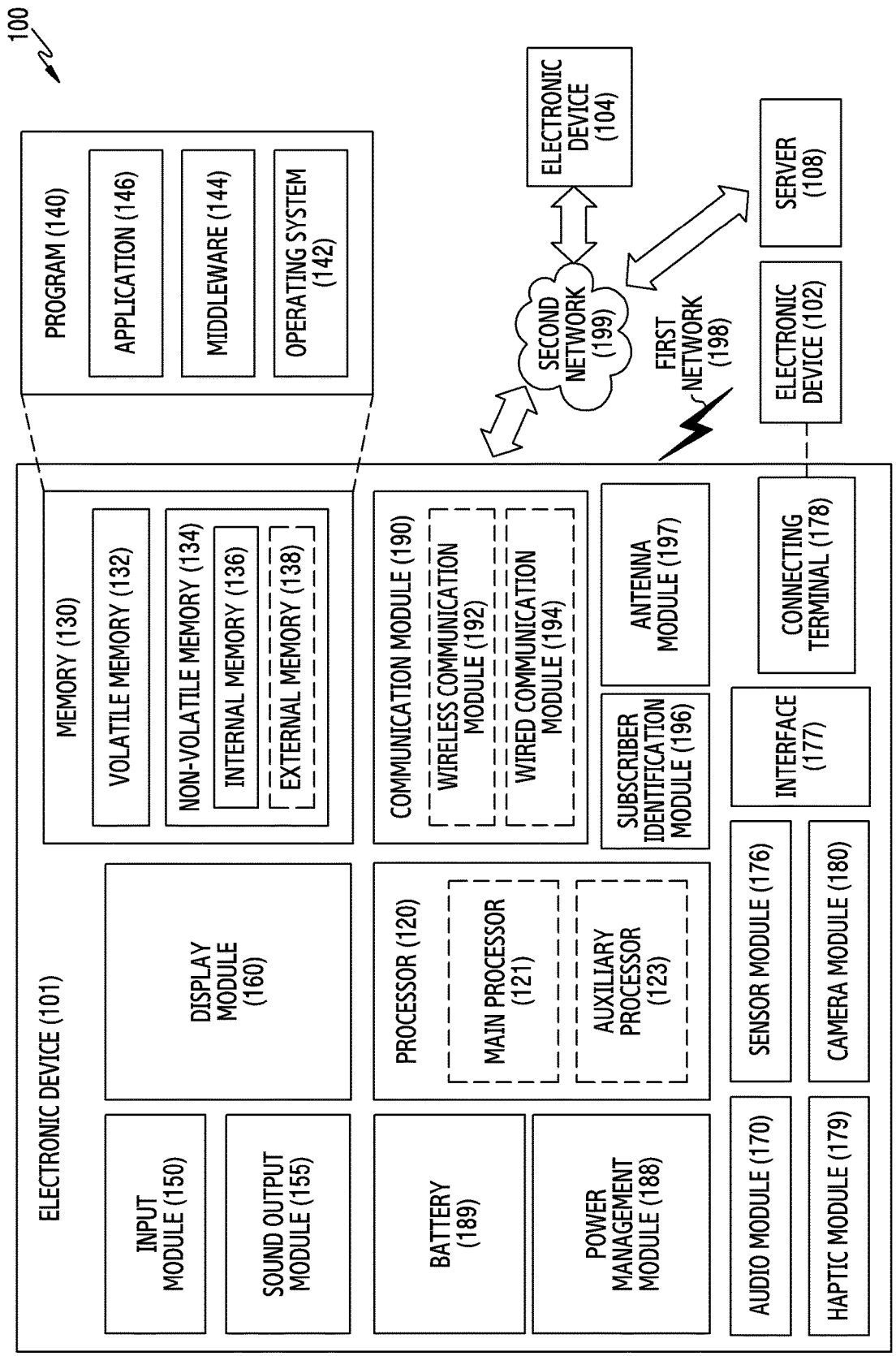
FIG. 1 is a diagram illustrating an electronic device in a network environment according to an embodiment of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," ", connected with" or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
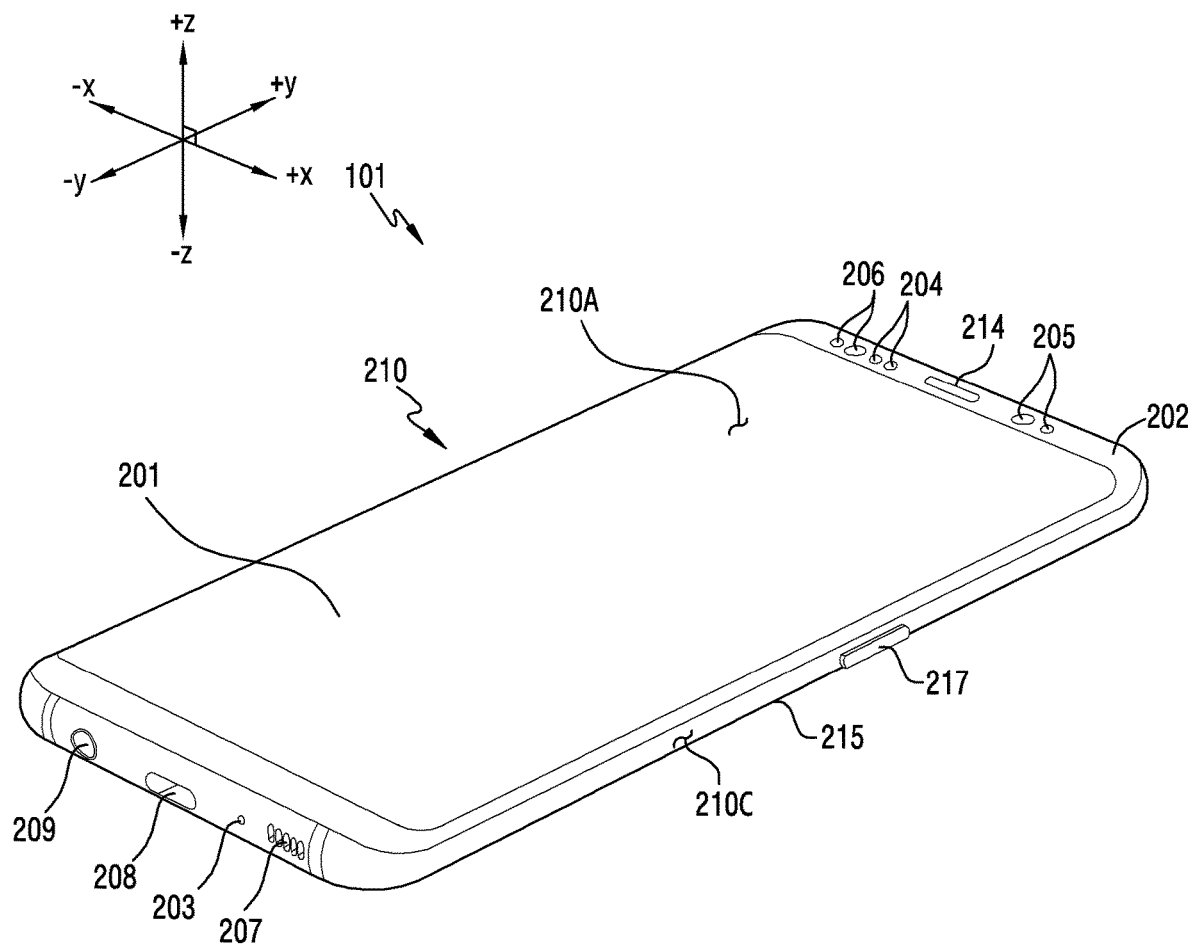
FIG. 2A is a perspective view illustrating an electronic device according to an embodiment of the disclosure.

FIG. 2A is a perspective view illustrating an electronic device according to an embodiment of the disclosure.

Figure 2B:
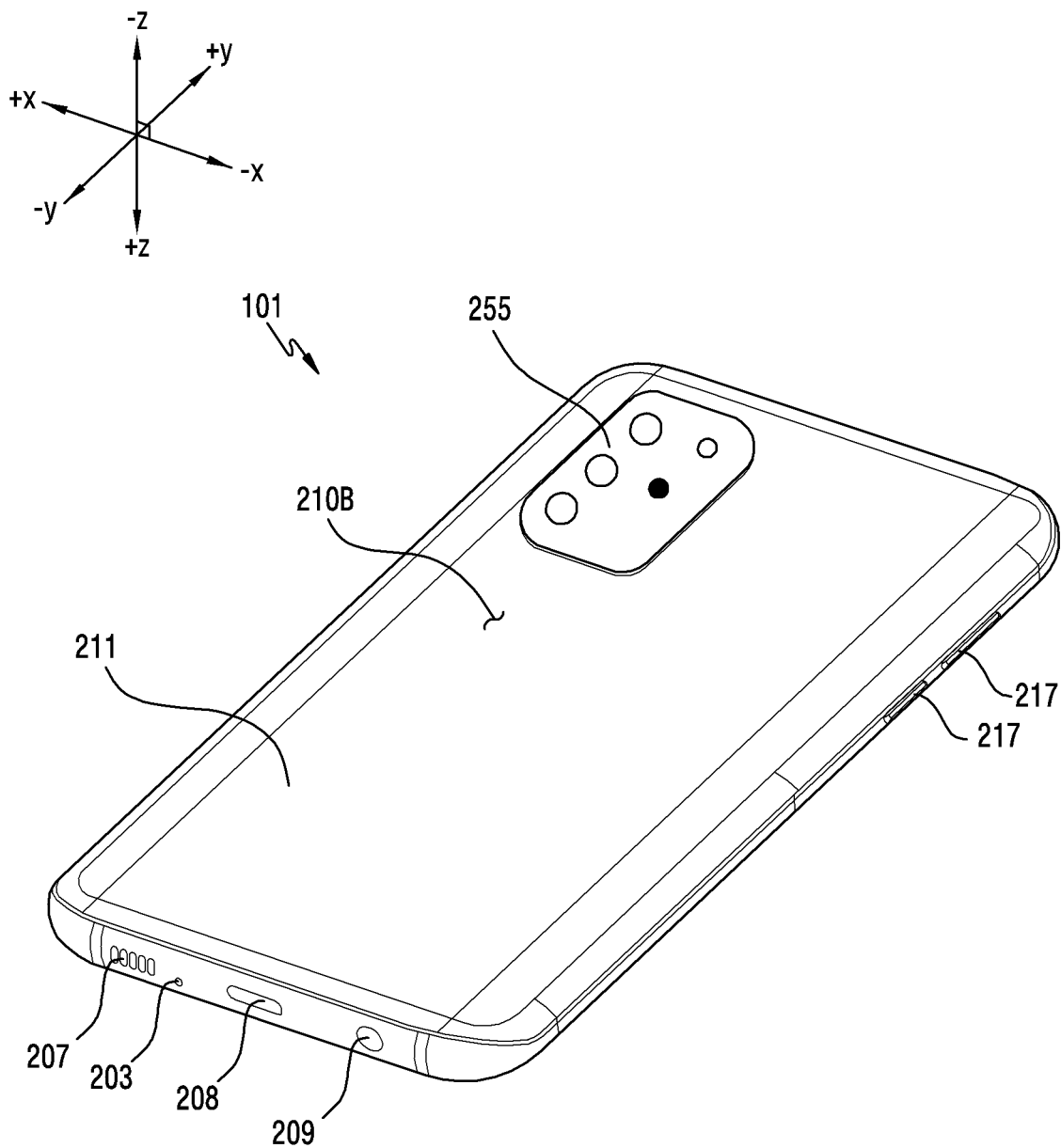
FIG. 2B is a perspective view illustrating a rear surface of an electronic device of FIG. 2A according to an embodiment of the disclosure.

FIG. 2B is a perspective view illustrating a rear surface of an electronic device of FIG. 2A according to an embodiment of the disclosure.

Referring to FIGS. 2A and 2B, the electronic device 101 according to an embodiment of the disclosure may include a housing 210 including a first surface (or a front surface) 210A, a second surface (or rear surface) 210B, and a lateral surface 210C surrounding a space between the first surface 210A and the second surface 210B. In an embodiment (not illustrated), the housing may indicate a structure configuring a part of the first surface 210A, the second surface 210B, and the lateral surface 210C illustrated in FIGS. 2A and 2B.

According to an embodiment of the disclosure, the first surface 210A of the electronic device 101 may be configured by a front surface plate 202 (e.g., a polymer plate or a glass plate including various coating layers), at least a part of which is substantially transparent. In an embodiment of the disclosure, the front surface plate 202 may include a curved part seamlessly extended by being bent from the first surface 210A toward the rear surface cover 211 at least one side edge portion.

According to an embodiment of the disclosure, the second surface 210B may be configured by the rear surface cover 211 that is substantially opaque. The rear surface cover 211 may be made of, for example, coated or colored glass, ceramic, polymer, metal (e.g., aluminum, stainless steel (STS), or magnesium), or a combination of two or more of the materials. According to an embodiment of the disclosure, the rear surface cover 211 may include a curved part seamlessly extended by being bent from the second surface 210B toward the front surface plate 202 at least one side edge portion.

According to an embodiment of the disclosure, the lateral surface 210C of the electronic device 101 may be coupled to the front surface plate 202 and the rear surface cover 211, and may be configured by a frame 215 including metal and/or polymer. In an embodiment of the disclosure, the rear surface cover 211 and the frame 215 may be integrally configured, and may include substantially the same material (e.g., a metal material, such as aluminum).

According to an embodiment of the disclosure, the electronic device 101 may include at least one of a display 201, an audio module 170, a sensor module 204, a first camera module 205, a key input device 217, a first connector hole 208, and a second connector hole 209. In an embodiment of the disclosure, the electronic device 101 may omit at least one (e.g., the key input device 217) of the elements or additionally include another element. For example, within a region provided by the front surface plate 202, a sensor, such as a proximity sensor or an illuminance sensor may be integrated with the display 201 or may be disposed at a position adjacent to the display 201. In an embodiment of the disclosure, the electronic device 101 may further include a light emitting element 206, and the light emitting element 206 may be disposed at a position adjacent to the display 201 within the region provided by the front surface plate 202. The light emitting element 206 may provide, for example, state information of the electronic device 101 by using light. In an embodiment of the disclosure, the light emitting element 206 may provide, for example, a light source interworking with an operation of the first camera module 205. The light emitting element 206 may include a light emitting diode (LED), an IR LED, and a xenon lamp, for example.

The display 201 may be, for example, exposed through a considerable part of the front surface plate 202. In an embodiment of the disclosure, an edge of the display 201 may be configured to be substantially identical to the shape of an outer portion (e.g., a curved surface) of the front surface plate 202 adjacent to the edge. In an embodiment of the disclosure, in order to expand the area by which the display 201 is exposed, the gap between the outer portion of the display 201 and the outer portion of the front surface plate 202 may be configured to be substantially identical to each other. In an embodiment of the disclosure, a recess or an opening may be disposed in a part of a screen display region of the display 201, and a different electronic component, for example, the first camera module 205, or a proximity sensor or an illuminance sensor not illustrated may be included to be aligned with the recess or the opening.

In an embodiment of the disclosure, the display 201 may be coupled to or disposed to be adjacent to a touch sensing circuit, a pressure sensor capable of measuring the strength (pressure) of a touch, and/or a digitizer that detects a magnetic field-type stylus pen.

In an embodiment of the disclosure, the audio module 170 may include a microphone hole 203, at least one speaker hole 207, and a call receiver hole 214. A microphone for obtaining external sound may be disposed in the microphone hole 203, and in an embodiment of the disclosure, a plurality of microphones may be arranged therein to detect the direction of sound. In an embodiment of the disclosure, the at least one speaker hole 207 and the call receiver hole 214 may be implemented to be integrated with the microphone hole 203 as one hole, or a speaker may be included without the at least one speaker hole 207 and the call receiver hole 214 (e.g., a piezo speaker).

In an embodiment of the disclosure, the electronic device 101 may include the sensor module 204, and thus may generate an electrical signal or a data value corresponding to an internal operation state or an external environment state of the electronic device 101. The sensor module 204 may include, for example, a proximity sensor disposed on the first surface 210A of the housing 210, a fingerprint sensor integrated with or disposed adjacent to the display 201, and/or a biometric sensor (e.g., an HRM sensor) disposed on the second surface 210B of the housing 210. The electronic device 101 may further include at least one of sensor modules not illustrated, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

In an embodiment of the disclosure, the electronic device 101 may include a second camera module 255 disposed on the second surface 210B. The first camera module 205 and the second camera module 255 may each include one or a plurality of lenses, an image sensor, and/or an image signal processor. A flash not illustrated may be disposed on the second surface 210B. The flash may include, for example, a light emitting diode or a xenon lamp. In an embodiment of the disclosure, two or more lenses (an infrared camera, and wide-angle and telephoto lenses) and image sensors may be arranged on one surface of the electronic device 101.

In an embodiment of the disclosure, the key input device 217 may be disposed on the lateral surface 210C of the housing 210. In an embodiment of the disclosure, the electronic device 101 may not include a part or the entirety of the key input device 217 mentioned above, and the key input device 217 that is not included may be implemented in a different type, such as a soft key on the display 201. In an embodiment of the disclosure, the key input device may include at least a part of a fingerprint sensor disposed on the second surface 210B of the housing 210.

In an embodiment of the disclosure, the connector holes 208 and 209 may include the first connector hole 208 capable of receiving a connector (e.g., a USB connector) for transmission or reception of power and/or data with an external electronic device, and/or the second connector hole (e.g., an earphone jack) 209 capable of receiving a connector for transmission or reception of an audio signal with an external electronic device.

Referring to FIGS. 2A and 2B, the electronic device 101 is illustrated as corresponding to a bar type, but this merely corresponds to an example, and the electronic device 101 may correspond to various types of devices in practice. For example, the electronic device 101 may correspond to a foldable device, a slidable device, a wearable device (e.g., a smart watch or wireless earphones), or a tablet personal computer (PC). Therefore, the technical concept disclosed herein is not limited to a bar-type device illustrated in FIGS. 2A and 2B, and may be applied to various types of devices.

Figure 3:
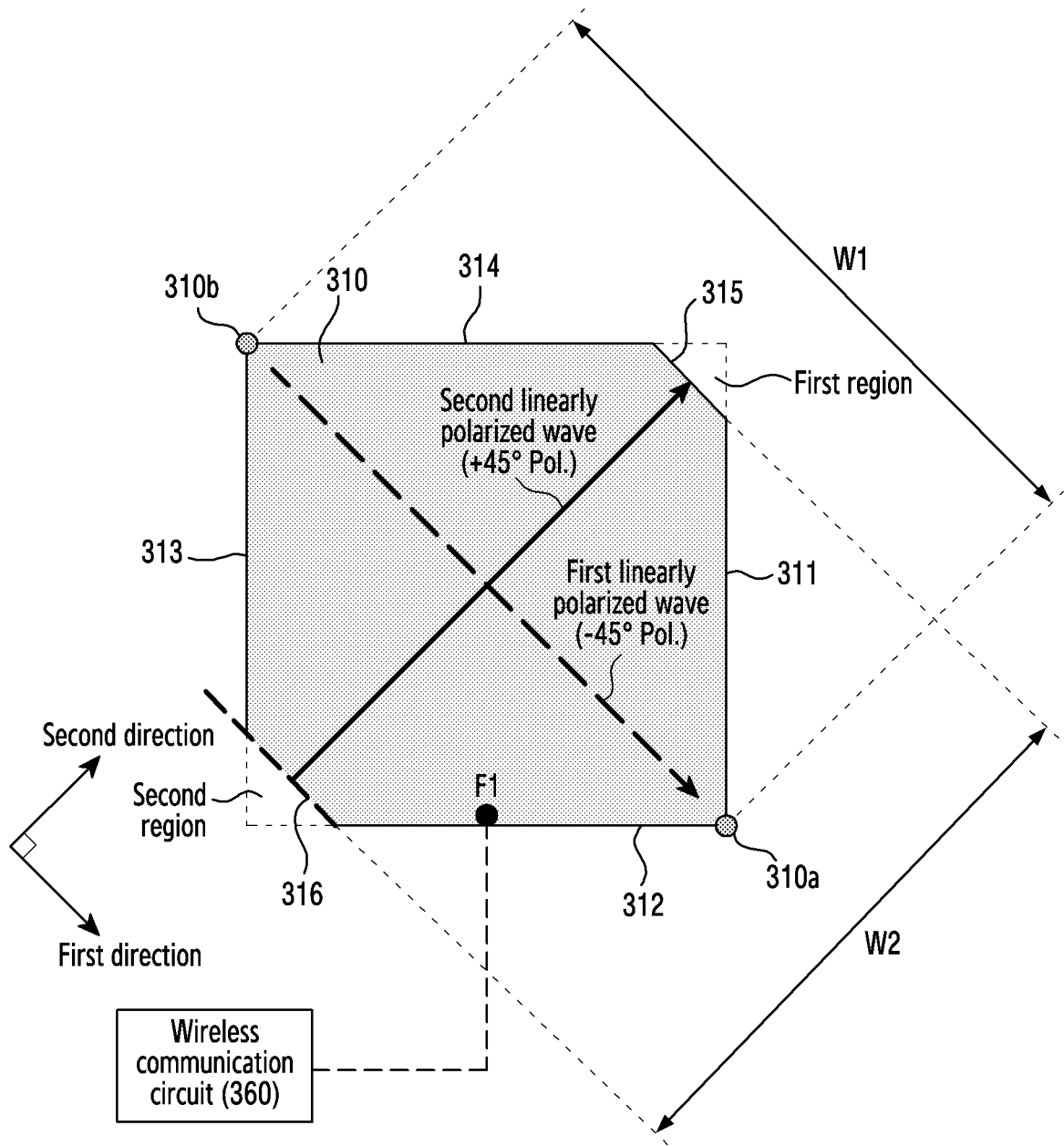
FIG. 3 is a diagram illustrating a first conductive patch according to an embodiment of the disclosure.

FIG. 3 is a diagram illustrating a first conductive patch according to an embodiment of the disclosure.

Referring to FIG. 3, the electronic device 101 according to an embodiment of the disclosure may include a first conductive patch 310.

According to an embodiment of the disclosure, the first conductive patch 310 may include a first edge 311, a second edge 312, a third edge 313, a fourth edge 314, a fifth edge 315, and/or a sixth edge 316. For example, the first conductive patch 310 may include the first edge 311 and the second edge 312 meeting the first edge 311 at a first corner 310a. The first conductive patch 310 may include the third edge 313 parallel to the first edge 311 and the fourth edge 314 meeting the third edge 313 at a second corner 310b. In addition, the first conductive patch 310 may include the fifth edge 315 connecting the first edge 311 and the fourth edge 314, and/or the sixth edge 316 connecting the second edge 312 and the third edge 313.

According to an embodiment of the disclosure, the first edge 311 and the second edge 312 may be substantially perpendicular to each other. According to an embodiment of the disclosure, the third edge 313 and the fourth edge 314 may be substantially perpendicular to each other. In an embodiment of the disclosure, the fifth edge 315 may correspond to an edge extending from one end of the first edge 311 in parallel to a first direction and meeting the fourth edge 314. The sixth edge 316 may correspond to an edge extending from one end of the second edge 312 in parallel to the first direction and meeting the third edge 313. The first direction may correspond to a direction toward the first corner 310a from the second corner 310b.

According to an embodiment of the disclosure, the first conductive patch 310 may have a first width W1 in the first direction, and the first conductive patch 310 may have a second width W2 smaller than the first width W1 in a second direction perpendicular to the first direction. The second direction may correspond to a direction perpendicular to the first direction. As another example, the second direction may correspond to a direction toward the fifth edge 315 from the sixth edge 316.

In the above description, the shape of the first conductive patch 310 according to an embodiment has been expressed based on edges, but the shape of the first conductive patch 310 may be expressed in various other methods.

For example, the first conductive patch 310 may be expressed to have a shape obtained by removing one region from a quadrangular shape. For example, the first conductive patch 310 may correspond to a shape obtained by removing a first region and a second region from a quadrangular shape. In an example, the first region and the second region may each have a triangular shape. In addition, the first region and the second region may have substantially the same size, and may face each other.

According to an embodiment of the disclosure, the electronic device 101 may include a wireless communication circuit 360. The wireless communication circuit 360 may feed power to a first point F1 of the first conductive patch 310. According to the feeding, a first signal having a first linearly polarized wave parallel to the first direction and/or a second signal having a second linearly polarized wave parallel to the second direction may be generated on the first conductive patch 310.

For example, the first signal having the first linearly polarized wave may have a phase of about −45 degrees. The second signal having the second linearly polarized wave may have a phase of about +45 degrees. Therefore, the first signal having the first linearly polarized wave and the second signal having the second linearly polarized wave may have a phase difference of about 90 degrees.

The first signal having the first linearly polarized wave in the disclosure may be referred to as a polarized wave having a relatively low frequency band compared to that of the second signal having the second linearly polarized wave. For example, the first conductive patch 310 may have the first width W1 in the first direction greater than the second width W2 in the second direction. Accordingly, a signal having a linearly polarized wave in the first direction may correspond to a frequency band lower than that of a signal having a linearly polarized wave in the second direction. A linearly polarized wave in the first direction having a relatively low frequency band may be referred to as a first linearly polarized wave. A linearly polarized wave in the second direction having a relatively high frequency band may be referred to as a second linearly polarized wave.

The shape of the first conductive patch 310 illustrated in FIG. 3 merely corresponds to an example, and a conductive patch included in the electronic device 101 may have various shapes. For example, with reference to FIG. 3, the shape of the first conductive patch 310 has been described as a shape obtained by removing, from a quadrangle, the first region and the second region each having a triangular shape. However, in an embodiment of the disclosure, a conductive patch included in the electronic device 101 may have a shape obtained by removing, from a quadrangle, the first region and the second region each having a quadrangular shape. Hereinafter, a shape of a conductive patch according to an embodiment will be described with reference to FIG. 4.

Figure 4:
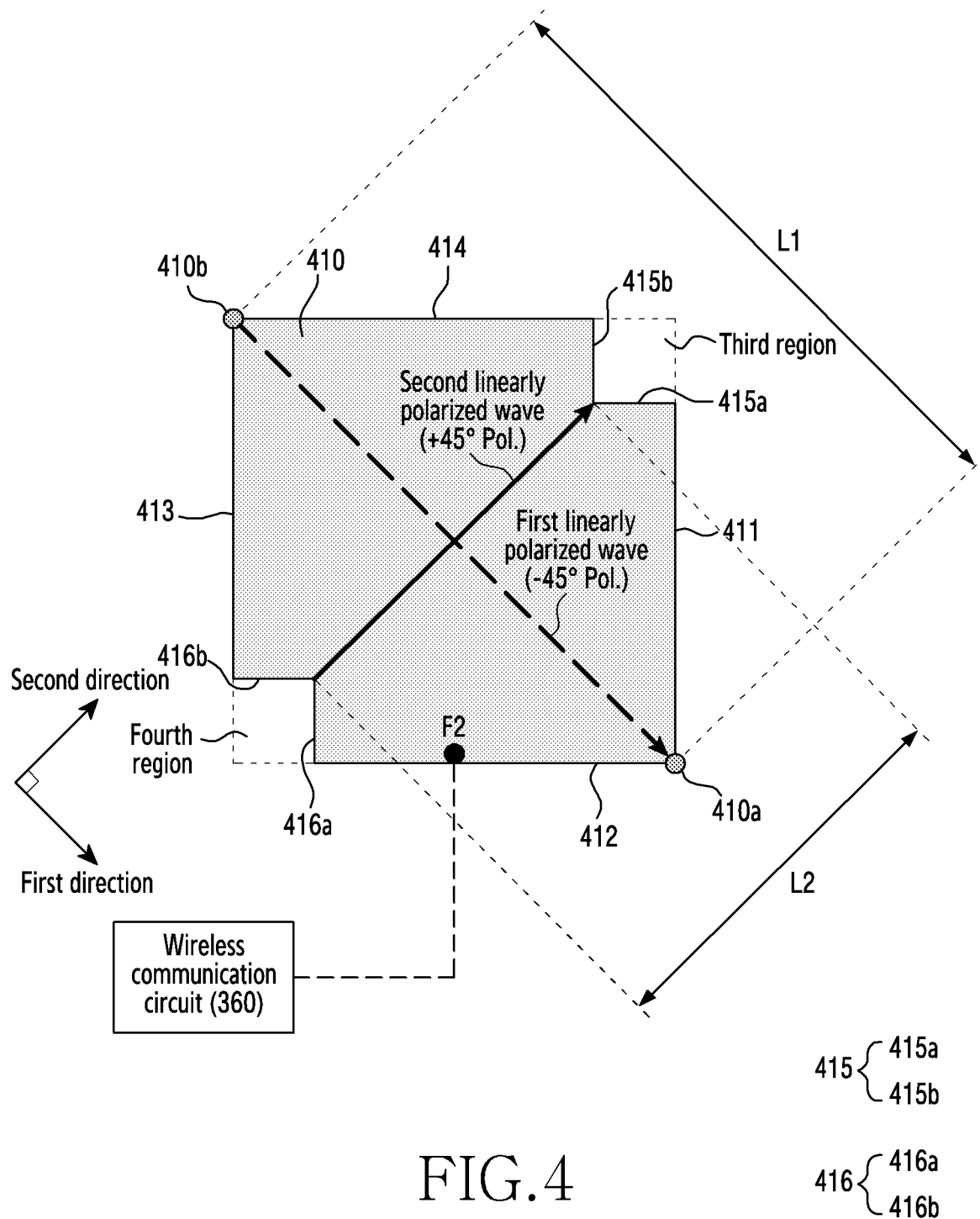
FIG. 4 is a diagram illustrating a first conductive patch according to an embodiment of the disclosure.

FIG. 4 is a diagram illustrating a first conductive patch according to an embodiment of the disclosure.

Referring to FIG. 4, the electronic device 101 according to an embodiment of the disclosure may include a first conductive patch 410.

According to an embodiment of the disclosure, the first conductive patch 410 may include a first edge 411, a second edge 412, a third edge 413, a fourth edge 414, a fifth edge 415, and/or a sixth edge 416.

For example, the first conductive patch 410 may include the first edge 411 and the second edge 412 meeting the first edge 411 at a first corner 410a. The first conductive patch 410 may include the third edge 413 parallel to the first edge 411 and the fourth edge 414 meeting the third edge 413 at a second corner 410b. In addition, the first conductive patch 410 may include the fifth edge 415 connecting the first edge 411 and the fourth edge 414, and/or the sixth edge 416 connecting the second edge 412 and the third edge 413.

According to an embodiment of the disclosure, the first edge 411 and the second edge 412 may be substantially perpendicular to each other. According to an embodiment of the disclosure, the third edge 413 and the fourth edge 414 may be substantially perpendicular to each other. In an embodiment of the disclosure, the fifth edge 415 may include a first part 415a extending from one end of the first edge 411 toward the third edge 413, and a second part 415b extending from the first part 415a toward the fourth edge 414 and meeting the fourth edge 414.

According to an embodiment of the disclosure, the first part 415a and the second part 415b of the fifth edge 415 may be substantially perpendicular to each other. The sixth edge 416 may include a third part 416a extending from one end of the second edge 412 toward the fourth edge 414, and a fourth part 416b extending from the third part 416a toward the third edge 413 and meeting the third edge 413. The third part 416a and the fourth part 416b of the sixth edge 416 may be substantially perpendicular to each other.

According to an embodiment of the disclosure, the first conductive patch 410 may have a first length L1 in a first direction, and the first conductive patch 410 may have a second length L2 smaller than the first length L1 in a second direction perpendicular to the first direction. The first direction may correspond to a direction toward the first corner 410a from the second corner 410b. The second direction may correspond to a direction perpendicular to the first direction.

According to an embodiment of the disclosure, the shape of the first conductive patch 410 according to an embodiment has been expressed based on edges, but the shape of the first conductive patch 410 may be expressed in various other methods. For example, the first conductive patch 410 may be expressed to have a shape obtained by removing one region from a quadrangular shape. For example, the first conductive patch 410 may correspond to a shape obtained by removing a third region and a fourth region from a quadrangular shape. In an example, the third region and the fourth region may each have a square shape. The third region and the fourth region may have substantially the same size, and may face each other.

According to an embodiment of the disclosure, the wireless communication circuit 360 may feed power to a second point F2 of the first conductive patch 410. According to the feeding, a first signal having a first linearly polarized wave parallel to the first direction and/or a second signal having a second linearly polarized wave parallel to the second direction may be generated on the first conductive patch 410. For example, the first signal having the first linearly polarized wave may have a phase of about −45 degrees. The second signal having the second linearly polarized wave may have a phase of about +45 degrees. Therefore, the first signal having the first linearly polarized wave and the second signal having the second linearly polarized wave may have a phase difference of about 90 degrees.

A first linearly polarized wave in the disclosure may indicate a polarized wave having a relatively low frequency band compared to that of a second linearly polarized wave. For example, the first conductive patch 410 may have the first length L1 in the first direction greater than the second length L2 in the second direction. Accordingly, a signal having a linearly polarized wave in the first direction may correspond to a frequency band lower than that of a signal having a linearly polarized wave in the second direction. A linearly polarized wave in the first direction having a relatively low frequency band may be referred to as the first linearly polarized wave. A linearly polarized wave in the second direction having a relatively high frequency band may be referred to as the second linearly polarized wave.

Figure 5:
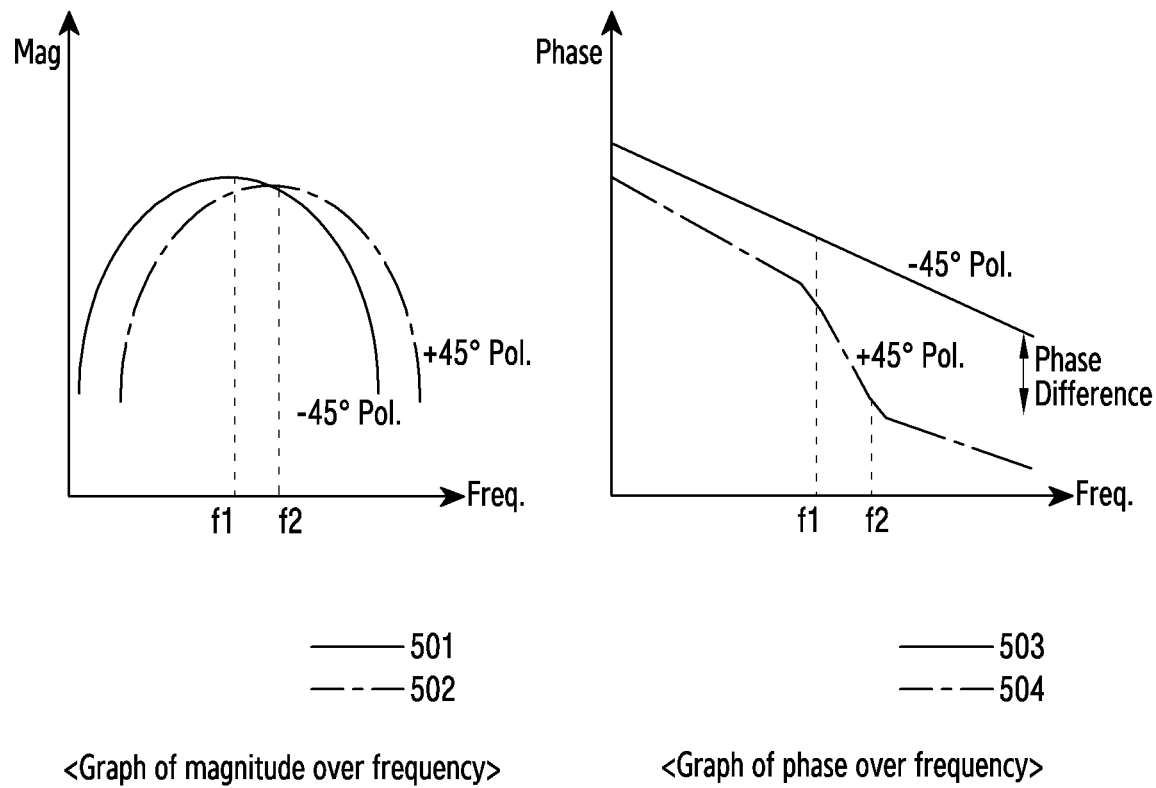
FIG. 5 illustrates graphs of magnitude and phase over frequency for signals generated according to feeding of a first conductive patch illustrated in FIG. 4 according to an embodiment of the disclosure.

FIG. 5 illustrates graphs of magnitude and phase over frequency for signals generated according to feeding of the first conductive patch illustrated in FIG. 4 according to an embodiment of the disclosure.

Referring to FIG. 5, in the graph of magnitude over frequency according to an embodiment of the disclosure, a first graph 501 may be referred to as a graph of radiation magnitude over the frequency of a first signal having a first linearly polarized wave. A second graph 502 may be referred to as a graph of radiation magnitude over the frequency of a second signal having a second linearly polarized wave.

In the first graph 501 and the second graph 502 according to an embodiment of the disclosure, frequency bands allowing maximum radiation magnitude are different. For example, the first graph 501 shows a maximum radiation magnitude at a first resonant frequency f1. The second graph 502 shows a maximum radiation magnitude at a second resonant frequency f2. Therefore, it may be noted that the first signal having the first linearly polarized wave and the second signal having the second linearly polarized wave have a first resonant frequency f1 and a second resonant frequency f2 which are different from each other, respectively.

According to an embodiment of the disclosure, the first signal having the first linearly polarized wave and the second signal having the second linearly polarized wave having different resonant frequencies may substantially result from a perturbation structure of the first conductive patch 310. The perturbation structure may be referred to as a structure obtained by removing a partial region (e.g., the first region and the second region in FIG. 3) from a quadrangular shape.

Referring to the graph of phase over frequency according to an embodiment of the disclosure, a third graph 503 may be referred to as a graph of phase over the frequency of a first signal having a first linearly polarized wave. A fourth graph 405 may be referred to as a graph of phase over the frequency of a second signal having a second linearly polarized wave.

In comparison between the third graph 503 and the fourth graph 504 according to an embodiment of the disclosure, it may be noted that the first signal having the first linearly polarized wave and the second signal having the second linearly polarized wave according to an embodiment have a phase difference of about 90 degrees.

Figure 6:
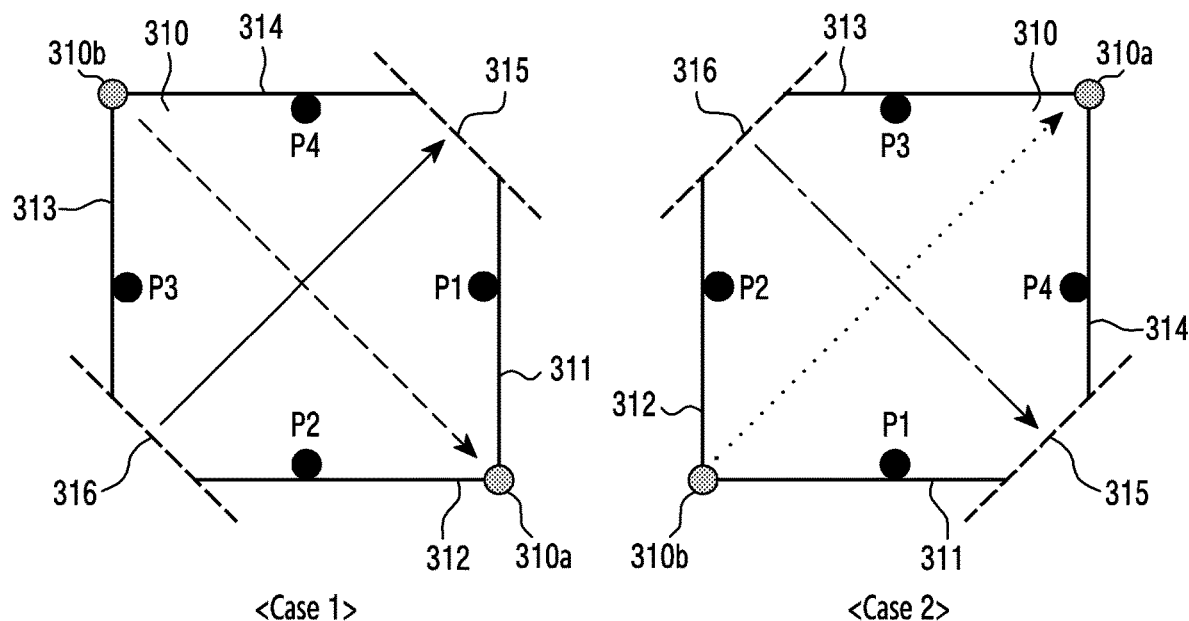
FIG. 6 is a diagram illustrating a linearly polarized wave direction and/or a circularly polarized wave direction changing according to an orientation and a feeding position of a first conductive patch according to an embodiment of the disclosure.

FIG. 6 is a diagram illustrating a linearly polarized wave direction and/or a circularly polarized wave direction changing according to an orientation and a feeding position of a first conductive patch according to an embodiment of the disclosure.

Referring to FIG. 6, case 1 where the first conductive patch 310 is disposed such that the direction from the second corner 310b toward the first corner 310a of the first conductive patch 310 according to an embodiment is a first direction, is illustrated. In addition, case 2 where the first conductive patch 310 is disposed such that the direction from the second corner 310b toward the first corner 310a of the first conductive patch 310 is a second direction, is illustrated.

As another example, case 1 according to an embodiment of the disclosure may be referred to as a case where the first edge 311 of the first conductive patch 310 is disposed in parallel to the y axis. Case 2 according to an embodiment of the disclosure may be referred to as a case where the first edge 311 of the first conductive patch 310 is disposed in parallel to the x axis. In addition, in comparison between case 1 and case 2, case 2 may be referred to as a case the first conductive patch 310 of case 1 is rotated by 90 degrees counterclockwise.

According to an embodiment of the disclosure, in case that the first conductive patch 310 is oriented as in case 1 or case 2, the wireless communication circuit 360 may feed power to one of the edges of the first conductive patch 310.

For example, the wireless communication circuit 360 may feed power to one point on the right edge of the first conductive patch 310. In case 1, the wireless communication circuit 360 may feed power to a first point P1 of the first edge 311 which is the right edge of the first conductive patch 310. In case 2, the wireless communication circuit 360 may feed power to a fourth point P4 of the fourth edge 314 which is the right edge of the first conductive patch 310. As another example, the wireless communication circuit 360 may feed power to one point on the left edge of the first conductive patch 310. In case 1, the wireless communication circuit 360 may feed power to a third point P3 of the third edge 313 which is the left edge of the first conductive patch 310. In case 2, the wireless communication circuit 360 may feed power to a second point P2 of the second edge 312 which is the left edge of the first conductive patch 310. As another example, the wireless communication circuit 360 may feed power to one point on the upper edge of the first conductive patch 310. In case 1, the wireless communication circuit 360 may feed power to the fourth point P4 of the fourth edge 314 which is the upper edge of the first conductive patch 310. In case 2, the wireless communication circuit 360 may feed power to the third point P3 of the third edge 313 which is the upper edge of the first conductive patch 310. As another example, the wireless communication circuit 360 may feed power to one point on the lower edge of the first conductive patch 310. In case 1, the wireless communication circuit 360 may feed power to the second point P2 of the second edge 312 which is the lower edge of the first conductive patch 310. In case 2, the wireless communication circuit 360 may feed power to the first point P1 of the first edge 311 which is the lower edge of the first conductive patch 310.

Table 1 shows the phases of linearly polarized waves (polarization, LP) and the directions of a circularly polarized wave (circular polarization, CP), which are generated according to feeding to the left, right, upper, and lower edges of the first conductive patch 310 in case 1.

TABLE 1

| Feeding point | Phase of first linearly polarized wave | Direction of circularly polarized wave (CP) | Phase of second linearly polarized wave |
|---|---|---|---|
| Upper edge | −45° | LHCP | +45° |
| Right edge | −45° | RHCP | +45° |
| Lower edge | −45° | LHCP | +45° |
| Left edge | −45° | RHCP | +45° |

Referring to Table 1, in case where the wireless communication circuit 360 according to an embodiment feeds power to the fourth point P4 of the fourth edge 314 that is the upper edge of the first conductive patch 310 in case 1, a first signal having a phase of −45 degrees and a relatively low resonant frequency may be a first linearly polarized wave (linear polarization). In addition, a second signal having a phase of +45 degrees and a relatively high resonant frequency may be a second linearly polarized wave. A circularly polarized wave (circular polarization) based on the first linearly polarized wave and the second linearly polarized wave may be left-handed circular polarization (LHCP).

In an embodiment of the disclosure, in case where the wireless communication circuit 360 feeds power to the first point P1 of the first edge 311 that is the right edge of the first conductive patch 310 in case 1, a first linearly polarized wave having a phase of −45 degrees and a second linearly polarized wave having a phase of +45 degrees may be generated. CP based on the first LP and the second LP may be generated as right-handed circular polarization (RHCP).

In an embodiment of the disclosure, in case where the wireless communication circuit 360 feeds power to the second point P2 of the second edge 312 that is the lower edge of the first conductive patch 310 in case 1, CP may be generated as LHCP. In an embodiment of the disclosure, in case where the wireless communication circuit 360 feeds power to the third point P3 of the third edge 313 that is the left edge of the first conductive patch 310 in case 1, CP may be generated as RHCP.

For example, referring to Table 1, in case that the first conductive patch 310 is oriented according to case 1, and the wireless communication circuit 360 feeds power to an edge (e.g., the first edge 311 or the third edge 313) parallel to the y axis, CP may be generated as RHCP. In addition, in case that the first conductive patch 310 is oriented according to case 1, and the wireless communication circuit 360 feeds power to an edge (e.g., the second edge 312 or the fourth edge 314) parallel to the x axis, CP may be generated as LHCP.

Referring to Table 1, it may be noted that the direction (e.g., RHCP or LHCP) of CP generated from the first conductive patch 310 changes according to the feeding point of the first conductive patch 310.

Table 2 shows the phases of linearly polarized waves (polarization, LP) and the directions of a circularly polarized wave (circular polarization, CP), which are generated according to feeding to the left, right, upper, and lower edges of the first conductive patch 310 in case 2.

TABLE 2

| Feeding point | Phase of third linearly polarized wave | Direction of circularly polarized wave (CP) | Phase of fourth linearly polarized wave |
| --- | --- | --- | --- |
| Upper edge | +45° | RHCP | −45° |
| Right edge | +45° | LHCP | −45° |
| Lower edge | +45° | RHCP | −45° |
| Left edge | +45° | LHCP | −45° |

Referring to Table 2, in case where the wireless communication circuit 360 according to an embodiment feeds power to the third point P3 of the third edge 313 that is the upper edge of the first conductive patch 310 in case 2, a third linearly polarized wave (linear polarization) having a phase of +45 degrees and a relatively low resonant frequency may be generated. In addition, a fourth linearly polarized wave having a phase of −45 degrees and having a relatively high resonant frequency compared to that of the third linearly polarized wave may be generated. A circularly polarized wave (circular polarization, CP) based on the third linearly polarized wave and the fourth linearly polarized wave may be generated as right-handed circular polarization (RHCP).

In an embodiment of the disclosure, in case where the wireless communication circuit 360 feeds power to the fourth point P4 of the fourth edge 314 that is the right edge of the first conductive patch 310 in case 2, a third linearly polarized wave having a phase of +45 degrees and a fourth linearly polarized wave having a phase of −45 degrees may be generated. In addition, CP based on the third linearly polarized wave and the fourth linearly polarized wave may be generated as left-handed circular polarization (LHCP).

In an embodiment of the disclosure, in case where the wireless communication circuit 360 feeds power to the first point P1 of the first edge 311 that is the lower edge of the first conductive patch 310 in case 2, CP may be generated as RHCP. In an embodiment of the disclosure, in case where the wireless communication circuit 360 feeds power to the second point P2 of the second edge 312 that is the left edge of the first conductive patch 310 in case 2, CP may be generated as LHCP.

For example, referring to Table 2, in case that the first conductive patch 310 is oriented according to case 2, and the wireless communication circuit 360 feeds power to an edge (e.g., the second edge 312 or the fourth edge 314) parallel to the y axis, CP may be generated as LHCP. In addition, in case that the first conductive patch 310 is oriented according to case 2, and the wireless communication circuit 360 feeds power to an edge (e.g., the first edge 311 or the third edge 313) parallel to the x axis, CP may be generated as RHCP. With reference to Table 2, it is noted that the direction (e.g., RHCP or LHCP) of CP generated from the first conductive patch 310 changes according to the feeding point of the first conductive patch 310.

In addition, in comparison between Tables 1 and 2, it may be noted that even when the feeding positions are substantially the same, the direction of a circularly polarized wave generated from the first conductive patch 310 changes according to the orientation of the first conductive patch 310. For example, in case that the wireless communication circuit 360 feeds power to the upper edge of the first conductive patch 310, and the first conductive patch 310 has an orientation of case 1, the direction of generated CP may correspond to RHCP. On the contrary, in case that the wireless communication circuit 360 feeds power to the upper edge of the first conductive patch 310, and the first conductive patch 310 has an orientation of case 2, the direction of CP may correspond to LHCP.

In addition, in comparison between Tables 1 and 2, it may be noted that the direction of linearly polarized waves generated from the first conductive patch 310 changes according to the orientation of the first conductive patch 310. For example, the first linearly polarized wave generated from the first conductive patch 310 having the orientation of case 1 may be parallel to the first direction. The second linearly polarized wave may be parallel to the second direction.

On the contrary, the third linearly polarized wave generated from the first conductive patch 310 having the orientation of case 2 may be parallel to the second direction. The fourth linearly polarized wave may be parallel to the fourth direction. Therefore, the first linearly polarized wave may have a direction different from that of the third linearly polarized wave corresponding to the first linearly polarized wave. The second linearly polarized wave may have a direction different from that of the fourth linearly polarized wave corresponding to the second linearly polarized wave.

According to an embodiment of the disclosure, it may be noted from Tables 1 and 2 that the direction of circularly polarized waves and/or linearly polarized waves generated from the first conductive patch 310 may change according to the orientation of the first conductive patch 310. In addition, it may be noted that the direction of linearly polarized waves generated from the first conductive patch 310 may change according to the feeding point of the first conductive patch 310.

Figure 7:
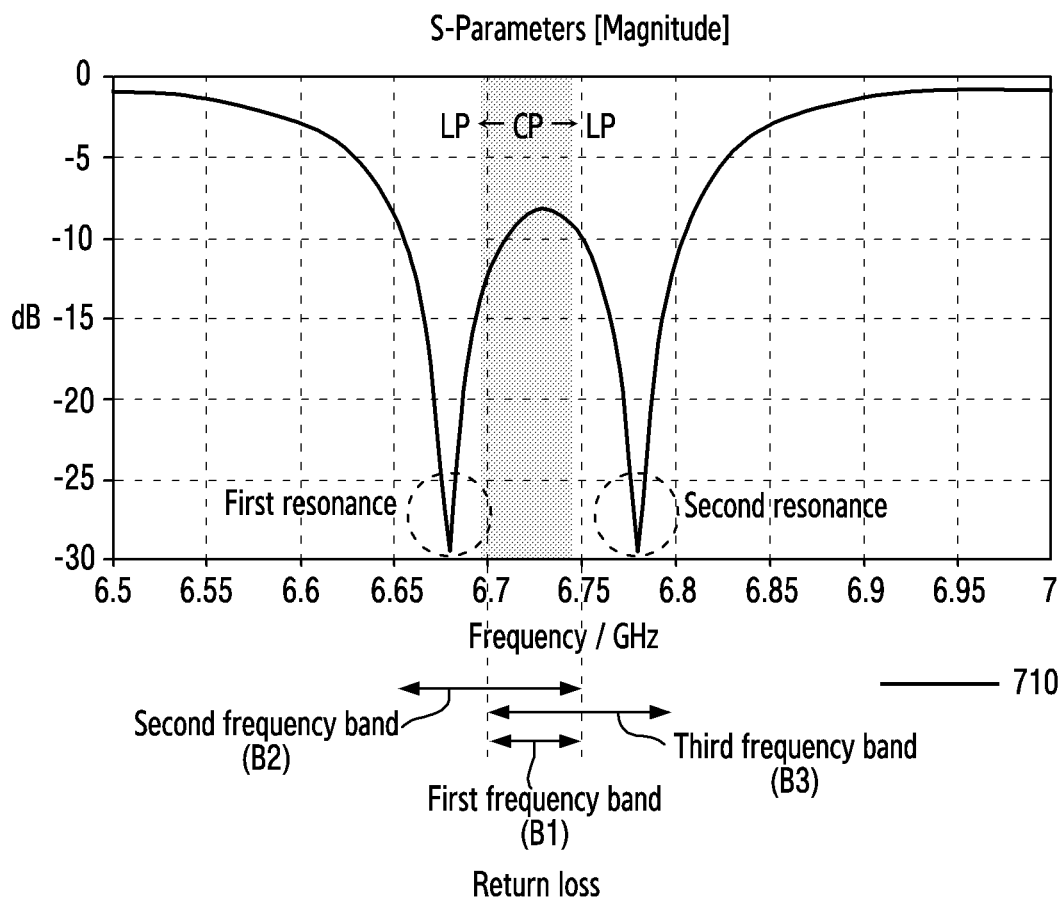
FIG. 7 illustrates a graph of a reflection coefficient according to feeding of a first conductive patch by a wireless communication circuit according to an embodiment of the disclosure.

FIG. 7 illustrates a graph of a reflection coefficient graph according to feeding of a first conductive patch by a wireless communication circuit according to an embodiment of the disclosure.

Referring to FIG. 7, a first graph 710 according to an embodiment of the disclosure may be referred to as a graph of a reflection coefficient according to feeding of a first conductive patch by the wireless communication circuit 360.

According to an embodiment of the disclosure, a first signal having a first linearly polarized wave and a second signal having a second linearly polarized wave may be generated according to feeding of, by the wireless communication circuit 360, the first conductive patch 310 including a perturbation structure. The perturbation structure may indicate a structure and a shape obtained by removing a region (e.g., the first region and the second region in FIG. 3, or the third region and the fourth region in FIG. 4) described with reference to FIG. 3 and/or FIG. 4.

According to an embodiment of the disclosure, the first graph 710 shows a value of about −28 to −8 dB in a frequency band of about 6.65 to 6.75 GHz. A first resonance of about 6.65 to 6.75 GHz may correspond to the first signal having the first linearly polarized wave. In addition, the first graph 710 shows a value of about −28 to −8 dB in a frequency band of about 6.7 to 6.8 GHz. A second resonance of about 6.7 to 6.8 GHz may correspond to the second signal having the second linearly polarized wave.

Referring to the first graph 710 according to an embodiment of the disclosure, the first resonance and the second resonance may overlap in the frequency band of about 6.7 to 6.75 GHz. In an embodiment of the disclosure, the wireless communication circuit 360 may feed the first conductive patch 310, thereby transmitting and/or receiving the first signal having the first linearly polarized wave caused by the first resonance and the second signal having the second linearly polarized wave caused by the second resonance in the frequency band of about 6.7 GHz to 6.75 GHz. Therefore, the wireless communication circuit 360 may transmit and/or receive a signal, based on a circularly polarized wave (circular polarization) in the frequency band of about 6.7 GHz to 6.75 GHz.

According to an embodiment of the disclosure, the wireless communication circuit 360 may transmit and/or receive a signal, based on a circularly polarized wave in a first frequency band B1 (e.g., 6.7 GHz to 6.75 GHz). The wireless communication circuit 360 may transmit and/or receive a signal, based on the first linearly polarized wave in a second frequency band B2 (e.g., 6.65 GHz to 6.7 GHz). The wireless communication circuit 360 may transmit and/or receive a signal, based on the second linearly polarized wave in a third frequency band B3 (e.g., 6.75 GHz to 6.8 GHz). Therefore, the electronic device 101 may transmit and/or receive a signal, based on both of a circularly polarized wave and a linearly polarized wave, thereby transmitting and/or receiving a signal in a relatively wide frequency band.

In an embodiment of the disclosure, the first frequency band B1 may correspond to a frequency band in which the second frequency band B2 and the third frequency band B3 overlap with each other. However, in case that the directions of the linearly polarized waves of the first frequency band B1 and the second frequency band B2 are mismatched, severe degradation of communication performance may occur. For example, in case that the directions of the linearly polarized waves of the first frequency band B1 and the second frequency band B2 are mismatched, call quality may degrade when the electronic device 101 performs call connection with an external device.

Figure 8:
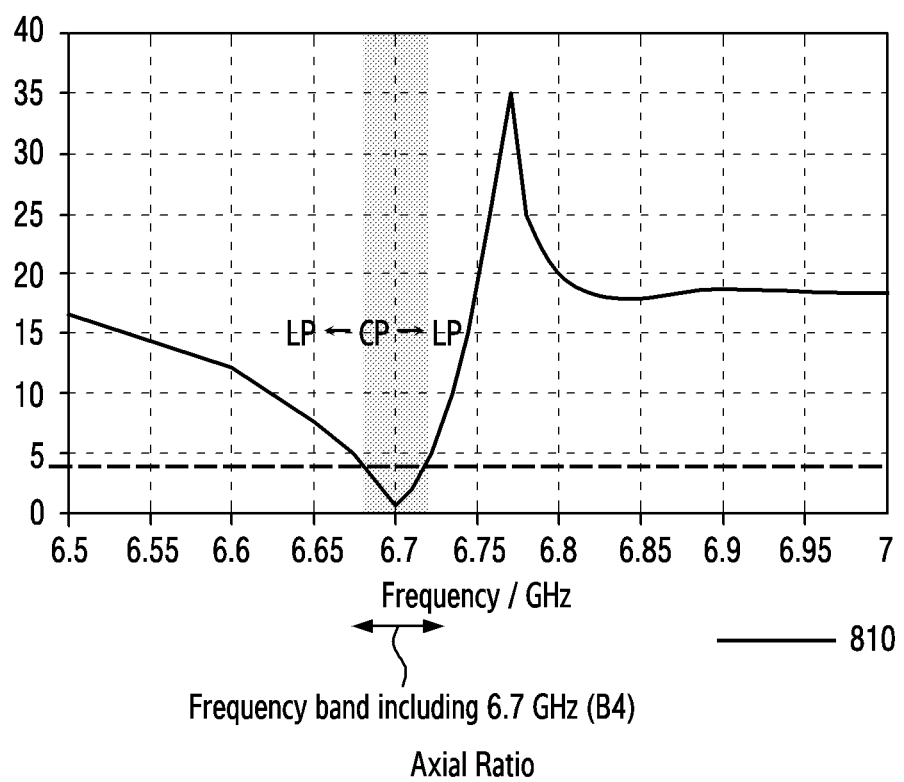
FIG. 8 illustrates a graph of an axial ratio between linearly polarized waves according to feeding of a first conductive patch by a wireless communication circuit according to an embodiment of the disclosure.

FIG. 8 illustrates a graph of an axial ratio between linearly polarized waves according to feeding of a first conductive patch by a wireless communication circuit according to an embodiment of the disclosure.

Referring to FIG. 8, a first graph 810 according to an embodiment of the disclosure may be referred to as a graph of the axial ratio of a first linearly polarized wave and a second linearly polarized wave according to feeding of the first conductive patch 310 by the wireless communication circuit 360.

According to an embodiment of the disclosure, the first graph 810 shows a value smaller than of about 3 in a frequency band including about 6.7 GHz. Therefore, it may be noted that the electronic device 101 is able to transmit and/or receive a signal by using a first signal having a first linearly polarized wave and a second signal having a second linearly polarized wave in a frequency band B4 including about 6.7 GHz.

Figure 9:
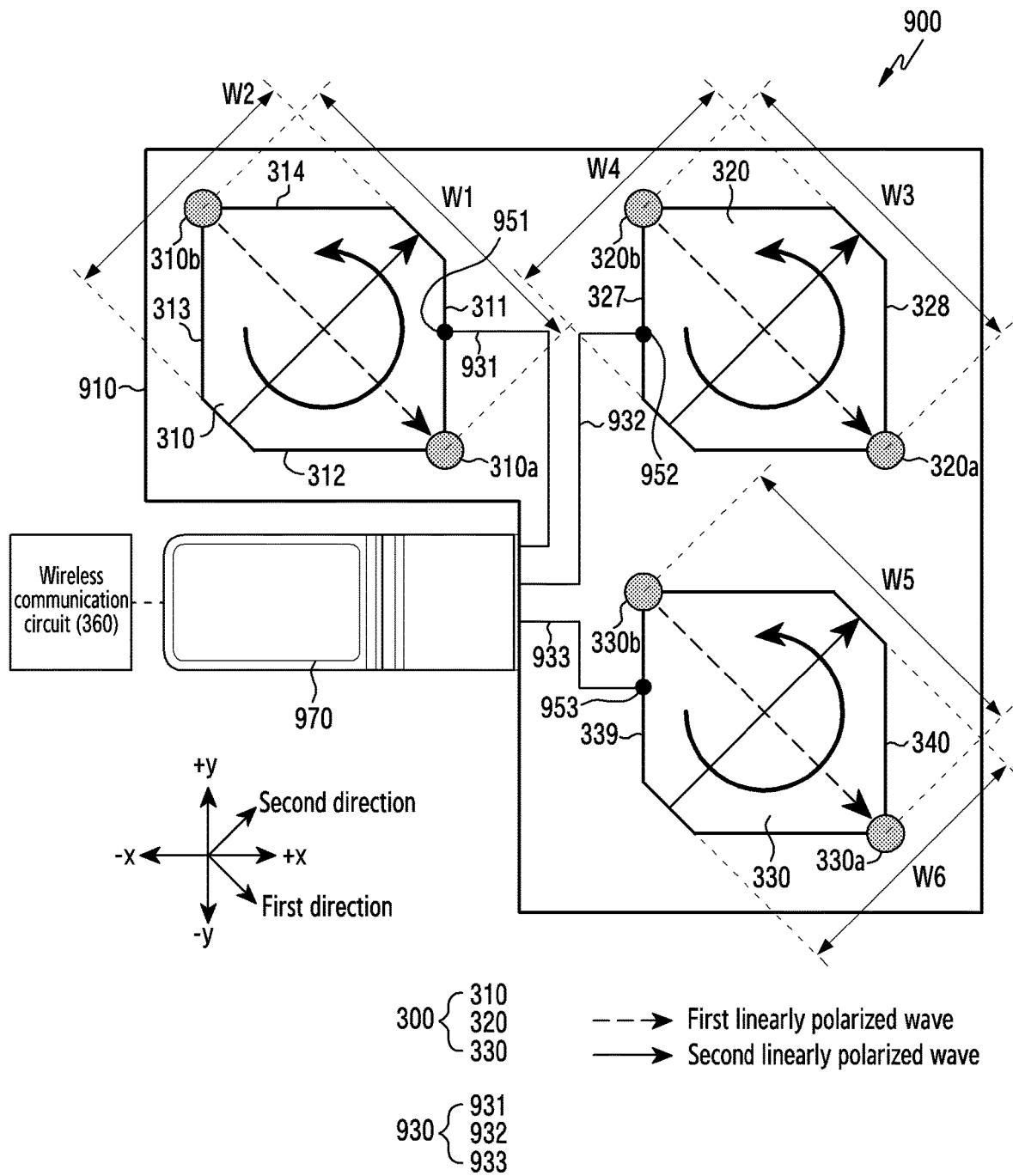
FIG. 9 is a diagram for illustrating a wireless communication circuit feeding power to an edge parallel to a y axis among edges of each of a plurality of conductive patches, to align the directions of polarized waves generated from the plurality of conductive patches according to an embodiment of the disclosure.

FIG. 9 is a diagram for illustrating a wireless communication circuit feeding power to an edge parallel to a y axis among edges of each of a plurality of conductive patches, to align the directions of polarized waves generated from the plurality of conductive patches according to an embodiment of the disclosure.

Referring to FIG. 9, the electronic device 101 according to an embodiment of the disclosure may include a substrate 910, the wireless communication circuit 360, transmission lines 930, and/or a plurality of conductive patches 300.

According to an embodiment of the disclosure, the plurality of conductive patches 300 may include a first conductive patch 310, a second conductive patch 320, and/or a third conductive patch 330. In an embodiment of the disclosure, the second conductive patch 320 and/or the third conductive patch 330 may have substantially the same shape as that of the first conductive patch 310. For example, the second conductive patch 320 and/or the third conductive patch 330 may have a shape obtained by removing a first region and a second region each having a triangular shape from a quadrangular shape, similar to the first conductive patch 310 described with reference to FIG. 3.

According to an embodiment of the disclosure, the plurality of conductive patches 300 may be substantially identically oriented. For example, the first conductive patch 310 may be disposed such that the direction from the second corner 310b toward the first corner 310a of the first conductive patch 310 is a first direction. In an embodiment of the disclosure, the second conductive patch 320 may be disposed such that the direction from a fourth corner 320b corresponding to the second corner 310b toward a third corner 320a corresponding to the first corner 310a is the first direction. In an embodiment of the disclosure, the third conductive patch 330 may be disposed such that the direction from a sixth corner 330b corresponding to the second corner 310b toward a fifth corner 330a corresponding to the first corner 310a is the first direction. For example, the plurality of conductive patches 300 may be oriented to have substantially the same shape.

As another example, the first conductive patch 310 may be disposed to have a first width W1 in the first direction and a second width W2 smaller than the first width W1 in a second direction. For example, the second conductive patch 320 may be disposed to have a third width W3 in the first direction and a fourth width W4 smaller than the third width W3 in the second direction. The third conductive patch 330 may be disposed to have a fifth width W5 in the first direction and a sixth width W6 smaller than the fifth width W5 in the second direction. For example, the plurality of conductive patches 300 may be oriented to have substantially the same shape.

According to an embodiment of the disclosure, the substrate 910 may include a plurality of conductive layers. For example, the substrate 910 may include a first layer on which an antenna radiator (e.g., a plurality of conductive patches 300) is disposed, and a second layer including a ground for an antenna operation. For example, the substrate 910 may be configured by a flexible printed circuit board (FPCB).

According to an embodiment of the disclosure, the plurality of conductive patches 300 may be arranged on the substrate 910. For example, the substrate 910 may be disposed in the electronic device 101 while facing the second surface (or rear surface) 210B of the electronic device 101. In an example, the plurality of conductive patches 300 may be disposed on the first layer among the plurality of layers of the substrate.

According to an embodiment of the disclosure, the plurality of conductive patches 300 may be arranged to be spaced apart from each other along a designated axis. For example, the second conductive patch 320 may be disposed to be spaced apart from the first conductive patch 310 along a first axis (e.g., x axis). The third conductive patch 330 may be disposed to be spaced apart from the second conductive patch 320 along a second axis (e.g., y axis).

In an example, the first axis and the second axis have been illustrated as being substantially perpendicular to each other, but this merely corresponds to an example. The first axis along which the first conductive patch 310 and the second conductive patch 320 are arranged and the second axis along which the second conductive patch 320 and the third conductive patch 330 are arranged may make various angles.

According to an embodiment of the disclosure, the wireless communication circuit 360 may be positioned in the direction crossing between the first conductive patch 310 and the third conductive patch 330 from the second conductive patch 320. For example, the wireless communication circuit 360 may be disposed in a direction opposite to the second direction with respect to the second conductive patch 320.

In an embodiment of the disclosure, the wireless communication circuit 360 may be electrically connected to the plurality of conductive patches 300 through a connection member 970. For example, the connection member 970 may include a connector connecting the wireless communication circuit 360 and the plurality of conductive patches 300 arranged on the substrate 910. In an embodiment of the disclosure, the connection member 970 may be omitted, and the wireless communication circuit 360 may be electrically connected to the plurality of conductive patches 300 without the connection member 970.

According to an embodiment of the disclosure, the wireless communication circuit 360 may be electrically connected through the transmission line 930 to an edge which is parallel to the y axis and allows minimization of the length of the transmission line 930, among the edges of each of the plurality of conductive patches 300. For example, the wireless communication circuit 360 may be electrically connected to a first feeding point 951 of the first edge 311 of the first conductive patch 931 through a first transmission line 931. The first edge 311 and the third edge 313 correspond to edges parallel to the y axis among the edges of the first conductive patch 310. However, an edge allowing minimization of the length of the first transmission line 931 corresponds to the first edge 311. Therefore, the wireless communication circuit 360 may be electrically connected to the first edge 311 through the first transmission line 931. The electronic device 101 may minimize the length of the first transmission line 931, thereby reducing loss caused by signal transmission. The first feeding point 951 may correspond to the first point P1 of the first conductive patch 310 in case 1 illustrated in FIG. 6.

As another example, the wireless communication circuit 360 may be electrically connected to a second feeding point 952 of a seventh edge 327 of the second conductive patch 320 through a second transmission line 932. In an example, the seventh edge 327 of the second conductive patch 320 may correspond to an edge facing the first edge 311 of the first conductive patch 310. The seventh edge 327 and an eighth edge 328 may correspond to edges parallel to the y axis among the edges of the second conductive patch 320. However, an edge allowing minimization of the length of the second transmission line 932 corresponds to the seventh edge 327. Therefore, the wireless communication circuit 360 may be electrically connected to the seventh edge 327 through the second transmission line 932. The electronic device 101 may minimize the length of the second transmission line 932, thereby reducing loss caused by signal transmission. The second feeding point 952 may correspond to the third point P3 of the first conductive patch 310 in case 1 illustrated in FIG. 6.

As another example, the wireless communication circuit 360 may be electrically connected to a third feeding point 953 of a ninth edge 339 of the third conductive patch 330 through a third transmission line 933. In an example, the ninth edge 339 of the third conductive patch 330 may correspond to an edge corresponding to the seventh edge 327 of the second conductive patch 320.

As another example, the ninth edge 339 of the third conductive patch 330 may correspond to an edge relatively the most adjacent to the first conductive patch 310. For example, when a virtual line parallel to the first edge 311 of the first conductive patch 310 is assumed, an edge which is perpendicularly the closest to the virtual line may be the ninth edge 339.

As another example, the ninth edge 339 of the third conductive patch 330 may correspond to an edge relatively the most adjacent to the first conductive patch 310 among the edges parallel to the seventh edge 327 of the second conductive patch 320. The ninth edge 339 and a tenth edge 340 may correspond to edges parallel to the y axis among the edges of the third conductive patch 330. However, an edge allowing minimization of the length of the third transmission line 933 corresponds to the ninth edge 339. Therefore, the wireless communication circuit 360 may be electrically connected to the ninth edge 339 through the third transmission line 933. The electronic device 101 may minimize the length of the third transmission line 933, thereby reducing loss caused by signal transmission. The third feeding point 953 may correspond to the third point P3 of the first conductive patch 310 in case 1 illustrated in FIG. 6.

According to an embodiment of the disclosure, the wireless communication circuit 360 may feed power to the first feeding point 951 of the first edge 311 of the first conductive patch 310, the second feeding point 952 of the seventh edge 327 of the second conductive patch 320 facing the first edge 311, and the third feeding point 953 of the ninth edge 339 of the third conductive patch 330 relatively adjacent to the first conductive patch 310 among the edges of the third conductive patch 330 parallel to the seventh edge 327. The wireless communication circuit 360 may transmit and/or receive a signal having a first frequency band through linearly polarized waves generated in the same direction and circularly polarized waves generated in the same direction from each of the plurality of conductive patches 300 according to the feeding.

According to an embodiment of the disclosure, the plurality of conductive patches 300 are arranged to have substantially the same orientation, and thus the electronic device 101 may align the directions of linearly polarized waves and/or the directions of circularly polarized waves generated from each of the plurality of conductive patches 300. For example, unlike the illustration in FIG. 9, a case where the first conductive patch 310 is rotated by +90 degrees may be assumed. The first edge 311 of the first conductive patch 310 rotated by +90 degrees may be disposed in parallel to the x axis.

The wireless communication circuit 360 may, through the transmission lines 930, feed power to the fourth edge 314 parallel to the y axis among the edges of the first conductive patch 310 rotated by +90 degrees and feed power to the seventh edge 327 of the second conductive patch 320 parallel to the y axis. According to the feeding, a third linearly polarized wave parallel to the first direction and a fourth linearly polarized wave parallel to the second direction may be generated on the first conductive patch 310 rotated by +90 degrees. The third linearly polarized wave may correspond to a signal having a relatively low frequency band compared to that of the fourth linearly polarized wave.

In addition, according to the feeding, a first linearly polarized wave parallel to the first direction and a second linearly polarized wave parallel to the second direction may be generated on the second conductive patch 320. Therefore, the third linearly polarized wave in the second direction on the first conductive patch 310 may have a direction not matching that of the first linearly polarized wave in the first direction on the second conductive patch 320.

Similarly, the fourth linearly polarized wave in the first direction on the first conductive patch 310 may have a direction not matching that of the second linearly polarized wave in the second direction on the second conductive patch 320. In addition, a circularly polarized wave generated from the first conductive patch 310 is an LHCP direction, and may have a direction different from that of a circularly polarized wave in an RHCP direction, generated from the second conductive patch 320. According to mismatch between the directions of linearly polarized waves and/or the directions of circularly polarized waves generated from the plurality of conductive patches 300, the performance of UWB communication of the electronic device 101 may deteriorate. On the contrary, in case that the plurality of conductive patches 300 have substantially the same orientation as illustrated in FIG. 3, the directions of linearly polarized waves and/or circularly polarized waves generated from the plurality of conductive patches 300 may coincide with each other. For example, a first linearly polarized wave parallel to the first direction and/or a second linearly polarized wave parallel to the second direction may be generated from each of the plurality of conductive patches 300. In addition, each circularly polarized wave generated from the plurality of conductive patches 300 may have an RHCP direction. Consequently, the electronic device 101 may align the directions of linearly polarized waves and/or circularly polarized waves generated from the plurality of conductive patches 300, thereby reducing or preventing deterioration of UWB communication performance.

According to an embodiment of the disclosure, the wireless communication circuit 360 may feed, through the transmission lines 930, power to an edge parallel to the y axis among the edges of each of the plurality of conductive patches 300, whereby the electronic device 101 may align the directions of circularly polarized waves generated from each of the plurality of conductive patches 300. For example, a case where the wireless communication circuit 360 feeds power to the second edge 312 parallel to the x axis among the edges of the first conductive patch 310, the seventh edge 327 of the second conductive patch 320 parallel to the y axis, and the ninth edge 339 of the third conductive patch 330 parallel to the y axis may be assumed. In addition, a circularly polarized wave generated from the first conductive patch 310 may have a LHCP direction.

On the contrary, each circularly polarized wave generated from the second conductive patch 320 and the third conductive patch 330 may have an RHCP direction. Therefore, when one conductive patch (e.g., the first conductive patch 310) among the plurality of conductive patches 300 is fed through an edge parallel to a first axis (e.g., x axis), and other conductive patches (e.g., the second conductive patch 320 and the third conductive patch 330) are each fed through an edge parallel to a second axis (e.g., y axis), the directions of circularly polarized waves generated from the plurality of conductive patches 300 may not coincide with each other. Consequently, the performance of UWB communication of the electronic device 101 may deteriorate.

On the contrary, in case that the wireless communication circuit 360 according to an embodiment feeds power to edges of the plurality of conductive patches 300 parallel to the y axis, circularly polarized waves generated from the plurality of conductive patches 300 may have substantially the same direction. For example, in case that the wireless communication circuit 360 feeds power to the first edge 311 of the first conductive patch 310, the seventh edge 327 of the second conductive patch 320, and the ninth edge 339 of the third conductive patch 330, generated circularly polarized waves may have the same direction (e.g., RHCP). Therefore, the electronic device 101 may allow circularly polarized waves generated from each of the plurality of conductive patches 300, to have substantially the same direction, thereby reducing or preventing deterioration of antenna performance caused by different directions of circularly polarized waves during UWB communication.

According to an embodiment of the disclosure, the electronic device 101 may provide various UWB functions, based on the plurality of conductive patches 300. For example, the wireless communication circuit 360 may identify, based on a signal received from an external device by using at least two of the plurality of conductive patches 300, the round trip time (RTT) and the angle of arrival (AoA) of the received signal, and the electronic device 101 may determine the location of the external device, based on the identified RTT and AoA.

According to an embodiment of the disclosure, the transmission line 930 may be configured by various conductive structures. For example, the transmission line 930 may be configured by a micro strip.

An embodiment of FIG. 9 has been described mainly on the plurality of conductive patches 300, but an antenna radiator for UWB communication is not limited to a conductive patch. In an embodiment of the disclosure, the plurality of conductive patches 300 may be replaced with various types of antennas (e.g., a monopole antenna, a dipole antenna, a slot antenna, and an inverted-F antenna (IFA)).

With reference to FIG. 9, a concept that the electronic device 101 includes the substrate 910, the wireless communication circuit 360, the transmission lines 930, and/or the plurality of conductive patches 300 has been described. However, it may also be described that the electronic device 101 includes a UWB antenna module 900, and the UWB antenna module 900 includes the substrate 910, the wireless communication circuit 360, the transmission lines 930, and/or the plurality of conductive patches 300.

Figure 10:
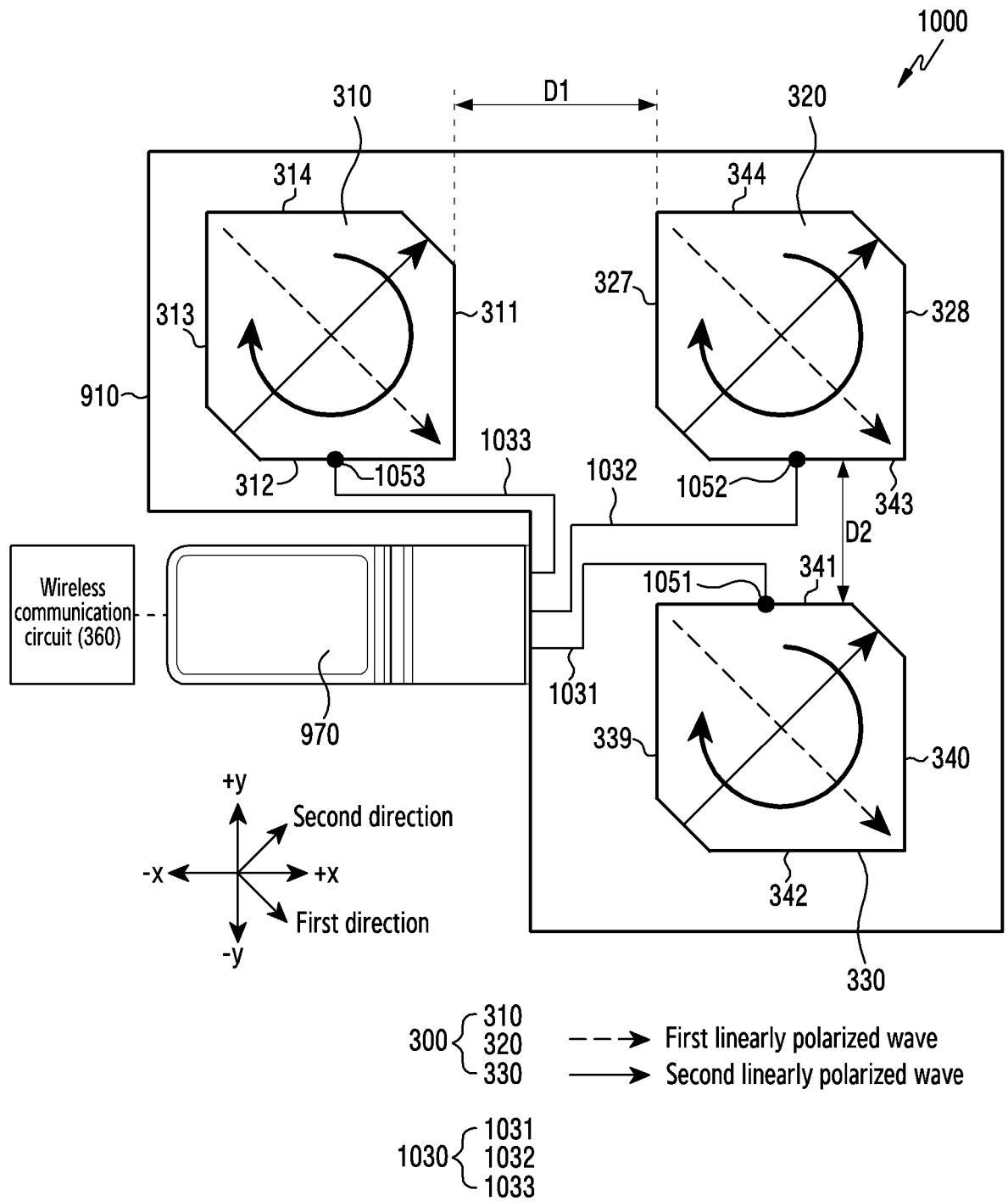
FIG. 10 is a diagram for illustrating a wireless communication circuit feeding power to an edge parallel to an x axis among edges of each of a plurality of conductive patches, to align directions of polarized waves generated from the plurality of conductive patches according to an embodiment of the disclosure.

FIG. 10 is a diagram for illustrating a wireless communication circuit feeding power to an edge parallel to an x axis among edges of each of a plurality of conductive patches, to align directions of polarized waves generated from the plurality of conductive patches according to an embodiment of the disclosure.

Referring to FIG. 10, the electronic device 101 according to an embodiment of the disclosure may include the substrate 910, the wireless communication circuit 360, transmission lines 1030, and/or the plurality of conductive patches 300. FIG. 10 corresponds to an embodiment in which the transmission line 930 of FIG. 9 is replaced with the transmission line 1030, and thus an overlapping description may be omitted.

According to an embodiment of the disclosure, the first conductive patch 310 and the second conductive patch 320 may be arranged to be spaced a first gap D1 apart from each other. The second conductive patch 320 and the third conductive patch 330 may arranged to be spaced a second gap D2 apart from each other. In an embodiment of the disclosure, the first gap D1 and the second gap D2 may be substantially the same or different from each other. In an embodiment of the disclosure, the first gap D1 and/or the second gap D2 may correspond to ½ of the wavelength corresponding to the frequency band of a radio frequency (RF) signal transmitted and/or received by the plurality of conductive patches 300. For example, in case that there are a plurality of frequency bands of an RF signal transmitted and/or received by the plurality of conductive patches 300, the first gap D1 and/or the second gap D2 may correspond to ½ of the wavelength corresponding to a relatively low frequency band. However, the first gap D1 and/or the second gap D2 is not limited to ½ of the wavelength, and the first gap D1 and/or the second gap D2 may have various lengths.

According to an embodiment of the disclosure, the wireless communication circuit 360 may be electrically connected through the transmission line 1030 to an edge which is parallel to the x axis and allows minimization of the length of the transmission line 1030, among the edges of each of the plurality of conductive patches 300. For example, the wireless communication circuit 360 may be electrically connected to a fourth feeding point 1051 of an eleventh edge 341 of the third conductive patch 330 through a first transmission line 1031. The eleventh edge 341 and a twelfth edge 342 correspond to edges parallel to the x axis among the edges of the third conductive patch 330. However, an edge allowing minimization of the length of the first transmission line 1031 corresponds to the eleventh edge 341. Therefore, the wireless communication circuit 360 may be electrically connected to the eleventh edge 341 through the first transmission line 1031. The electronic device 101 may minimize the length of the first transmission line 1031, thereby reducing loss caused by signal transmission. The fourth feeding point 1051 may correspond to the fourth point P4 of the first conductive patch 310 in case 1 illustrated in FIG. 6.

As another example, the wireless communication circuit 360 may be electrically connected to a fifth feeding point 1052 of a thirteenth edge 343 of the second conductive patch 320 through a second transmission line 1032. In an example, the thirteenth edge 343 of the second conductive patch 320 may correspond to an edge facing the eleventh edge 341 of the third conductive patch 330. The thirteenth edge 343 and a fourteenth edge 344 may correspond to edges parallel to the x axis among the edges of the second conductive patch 320. However, an edge allowing minimization of the length of the second transmission line 1032 corresponds to the thirteenth edge 343. Therefore, the wireless communication circuit 360 may be electrically connected to the thirteenth edge 343 through the second transmission line 1032. The electronic device 101 may minimize the length of the second transmission line 1032, thereby reducing loss caused by signal transmission. The first feeding point 1052 may correspond to the second point P2 of the first conductive patch 310 in case 1 illustrated in FIG. 6.

As another example, the wireless communication circuit 360 may be electrically connected to a sixth feeding point 1053 of the second edge 312 of the first conductive patch 310 through a third transmission line 1033. In an example, the second edge 312 of the first conductive patch 310 may correspond to an edge corresponding to the thirteenth edge 343 of the second conductive patch 320. As another example, the second edge 312 of the first conductive patch 310 may correspond to an edge relatively the most adjacent to the third conductive patch 330 among the edges of the first conductive patch 310. For example, when a virtual line parallel to the eleventh edge 341 of the third conductive patch 330 is assumed, an edge which is perpendicularly the closest to the virtual line may be the second edge 312.

As another example, the second edge 312 of the first conductive patch 310 may correspond to an edge relatively the most adjacent to the third conductive patch 330 among the edges parallel to the thirteenth edge 343 of the second conductive patch 320. The second edge 312 and the fourth edge 314 may correspond to edges parallel to the x axis among the edges of the first conductive patch 310. However, an edge allowing minimization of the length of the third transmission line 1033 corresponds to the second edge 312. Therefore, the wireless communication circuit 360 may be electrically connected to the second edge 312 through the third transmission line 1033. The electronic device 101 may minimize the length of the third transmission line 1033, thereby reducing loss caused by signal transmission. The sixth feeding point 1053 may correspond to the second point P2 of the first conductive patch 310 in case 1 illustrated in FIG. 6.

According to an embodiment of the disclosure, the wireless communication circuit 360 may feed power to the fourth feeding point 1051 of the eleventh edge 341 of the third conductive patch 330, the fifth feeding point 1052 of the thirteenth edge 343 of the second conductive patch 320 facing the eleventh edge 341, and the sixth feeding point 1053 of the second edge 312 of the first conductive patch 310 relatively adjacent to the third conductive patch 330 among the edges of the first conductive patch 310 parallel to the thirteenth edge 343. The wireless communication circuit 360 may transmit and/or receive a signal having a first frequency band through linearly polarized waves generated in the same direction and circularly polarized waves generated in the same direction from each of the plurality of conductive patches 300 according to the feeding.

According to an embodiment of the disclosure, the plurality of conductive patches 300 are arranged to have substantially the same orientation, and thus the electronic device 101 may align the directions of linearly polarized waves and/or the directions of circularly polarized waves generated from each of the plurality of conductive patches 300.

According to an embodiment of the disclosure, the wireless communication circuit 360 may feed, through the transmission lines 1030, power to an edge parallel to the x axis among the edges of each of the plurality of conductive patches 300, whereby the electronic device 101 may align the directions of circularly polarized waves generated from each of the plurality of conductive patches 300. For example, a case where the wireless communication circuit 360 feeds power to the first edge 311 parallel to the y axis among the edges of the first conductive patch 310, the thirteenth edge 343 of the second conductive patch 320 parallel to the x axis, and the eleventh edge 341 of the third conductive patch 330 parallel to the x axis may be assumed. In addition, a circularly polarized wave generated from the first conductive patch 310 may have an RHCP direction.

On the contrary, each circularly polarized wave generated from the second conductive patch 320 and the third conductive patch 330 may have a LHCP direction. Therefore, when one conductive patch (e.g., the first conductive patch 310) among the plurality of conductive patches 300 is fed through an edge parallel to a second axis (e.g., y axis), and other conductive patches (e.g., the second conductive patch 320 and the third conductive patch 330) are each fed through an edge parallel to a first axis (e.g., x axis), the directions of circularly polarized waves generated from the plurality of conductive patches 300 may not coincide with each other. Consequently, the performance of UWB communication of the electronic device 101 may deteriorate.

On the contrary, in case that the wireless communication circuit 360 according to an embodiment feeds power to edges of the plurality of conductive patches 300 parallel to the x axis, circularly polarized waves generated from the plurality of conductive patches 300 may have substantially the same direction. For example, in case that the wireless communication circuit 360 feeds power to the second edge 311 of the first conductive patch 310, the thirteenth edge 327 of the second conductive patch 320, and the eleventh edge 339 of the third conductive patch 330, generated circularly polarized waves may have the same direction (e.g., LHCP). Therefore, the electronic device 101 may allow circularly polarized waves generated from each of the plurality of conductive patches 300, to have substantially the same direction, thereby reducing or preventing deterioration of antenna performance caused by different directions of circularly polarized waves during UWB communication.

According to an embodiment of the disclosure, the transmission line 1030 may be configured by various conductive structures. For example, the transmission line 1030 may be configured by a micro strip.

With reference to FIG. 10, a concept that the electronic device 101 includes the substrate 910, the wireless communication circuit 360, the transmission lines 1030, and/or the plurality of conductive patches 300 has been described, but this merely corresponds to an example. It may also be described that the electronic device 101 includes a UWB antenna module 1000, and the UWB antenna module 1000 includes the substrate 910, the wireless communication circuit 360, the transmission lines 1030, and/or the plurality of conductive patches 300.

Figure 11A:
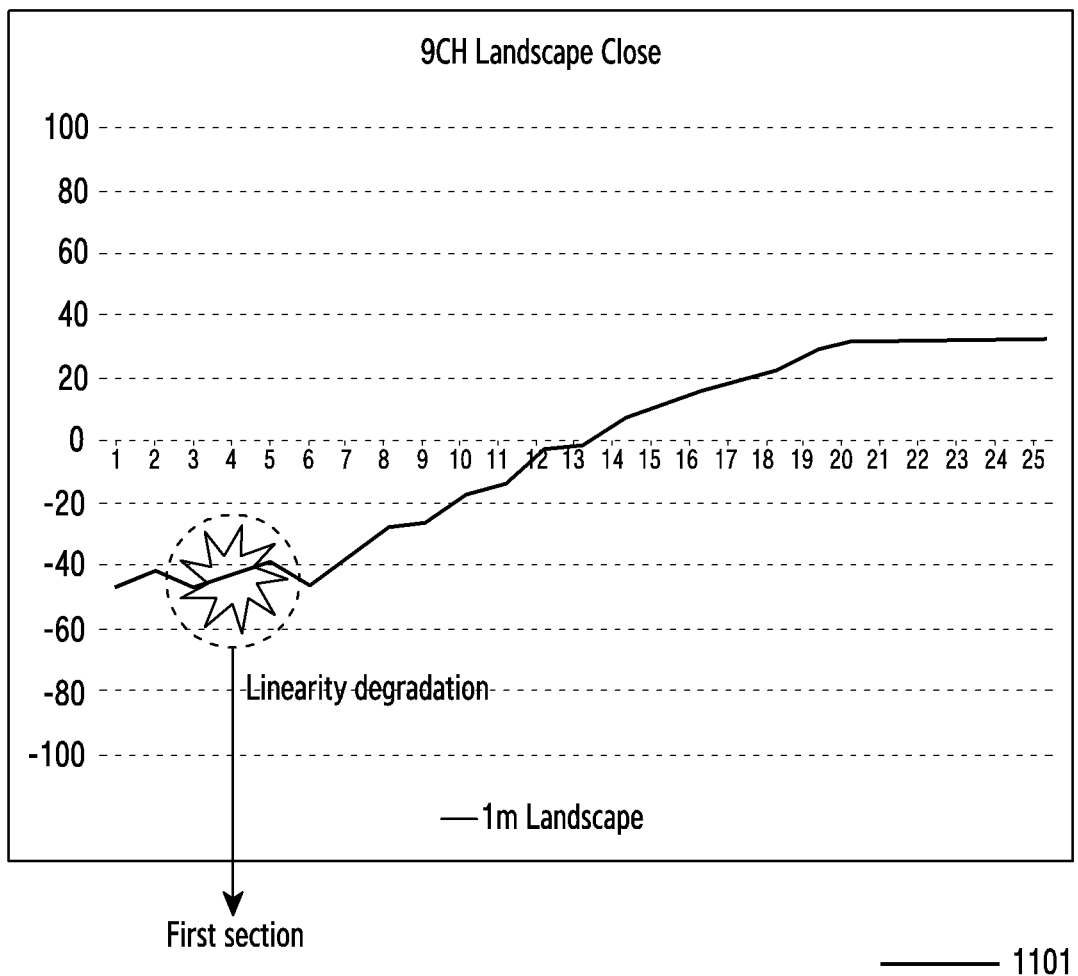
FIG. 11A illustrates a graph of a converted angle of arrival (AoA) of a case where directions of linearly polarized waves and/or circularly polarized waves generated from a plurality of conductive patches are different according to an embodiment of the disclosure.

FIG. 11A illustrates a graph of a converted angle-of-arrival (AoA) of a case where directions of linearly polarized waves and/or circularly polarized waves generated from a plurality of conductive patches are different according to an embodiment of the disclosure.

Referring to FIG. 11A, illustrated is a first graph 1101 that is a graph of an AoA converted from a phase difference of arrival (PDoA) identified based on a signal received from the plurality of conductive patches 300 in case that a fed edge of at least one conductive patch among the plurality of conductive patches 300 is not parallel to the fed edges of the other conductive patches 300 when the wireless communication circuit 360 according to an embodiment feeds power to edges of each of the plurality of communication patches 300.

For example, the first graph 1101 may correspond to a case where, in the embodiment of FIG. 9, the wireless communication circuit 360 feeds power to the second edge 312 parallel to the x axis among the edges of the first conductive patch 310, the seventh edge 327 of the second conductive patch 320 parallel to the y axis, and the ninth edge 339 of the third conductive patch 330 parallel to the y axis. As another example, the first graph 1101 may correspond to a case where, in the embodiment of FIG. 10, the wireless communication circuit 360 feeds power to the first edge 311 parallel to the y axis among the edges of the first conductive patch 310, the thirteenth edge 343 of the second conductive patch 320 parallel to the x axis, and the eleventh edge 341 of the third conductive patch 330 parallel to the x axis.

According to an embodiment of the disclosure, in the first graph 1101, it may be noted that the linearity of the graph in a first section degrades. Therefore, it may be noted that, in case that the wireless communication circuit 360 feeds power to an edge which is not parallel, while feeding the plurality of conductive patches 300, the directions of linearly polarized waves and/or circularly polarized waves become different from each other and the performance of UWB communication degrades.

Figure 11B:
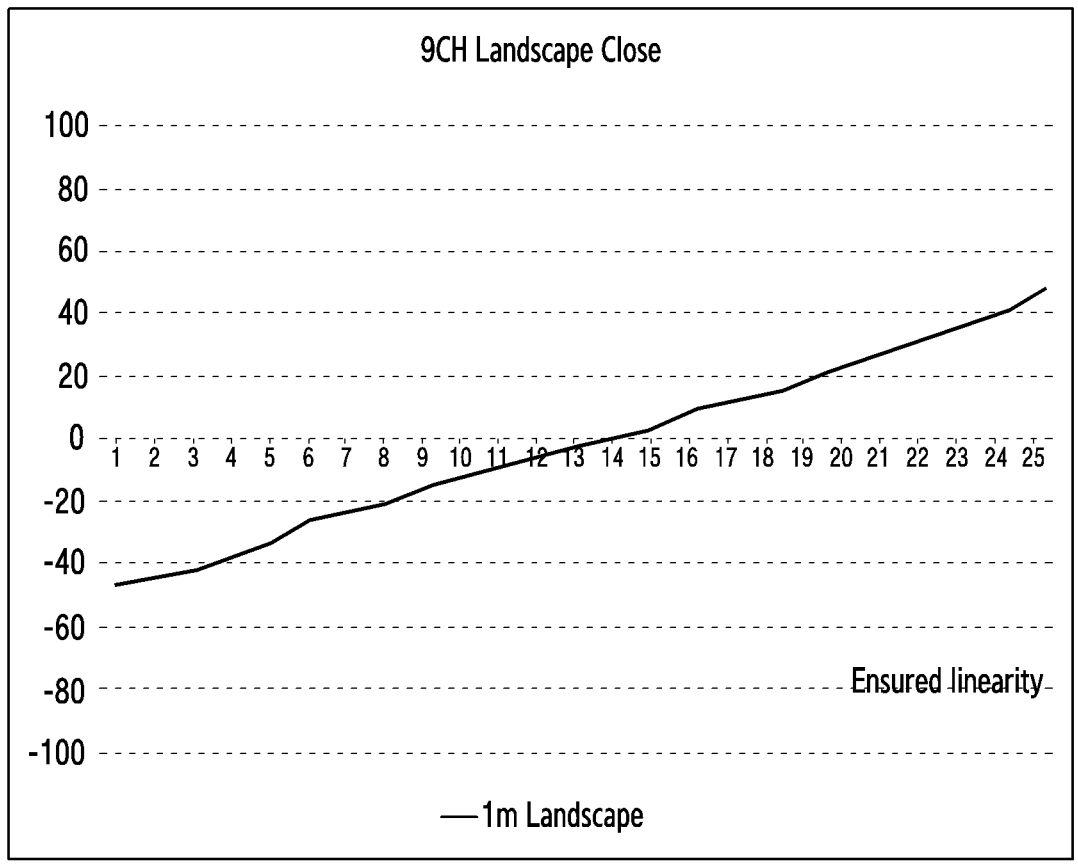
FIG. 11B illustrates a graph of a converted angle of arrival (AoA) of a case where directions of linearly polarized waves and/or circularly polarized waves generated from a plurality of conductive patches are a same according to an embodiment of the disclosure.

FIG. 11B illustrates a graph of a converted angle of arrival (AoA) of a case where directions of linearly polarized waves and/or circularly polarized waves generated from a plurality of conductive patches are a same according to an embodiment of the disclosure.

Referring to FIG. 11B, illustrated is a second graph 1102 that is a graph of an AoA converted from a phase difference of arrival (PDoA) identified based on a signal received from the plurality of conductive patches 300 when the wireless communication circuit 360 feeds power to edges of the plurality of conductive patches 300, which are parallel to each other, as in the embodiment of the disclosure described with reference to FIG. 9 or FIG. 10 according to an embodiment.

In comparison of the second graph 1102 according to an embodiment with the first graph 1101, it may be noted that the linearity of the graph in a different section including the first section is improved. Therefore, when feeding power to edges of the plurality of conductive patches 300, the electronic device 101 may feed power to an edge parallel to a designated axis (e.g., the y axis in FIG. 9 or the x axis in FIG. 10) among the edges of each of the plurality of conductive patches 300, thereby preventing or reducing degradation of the performance of UWB communication.

Figure 12:
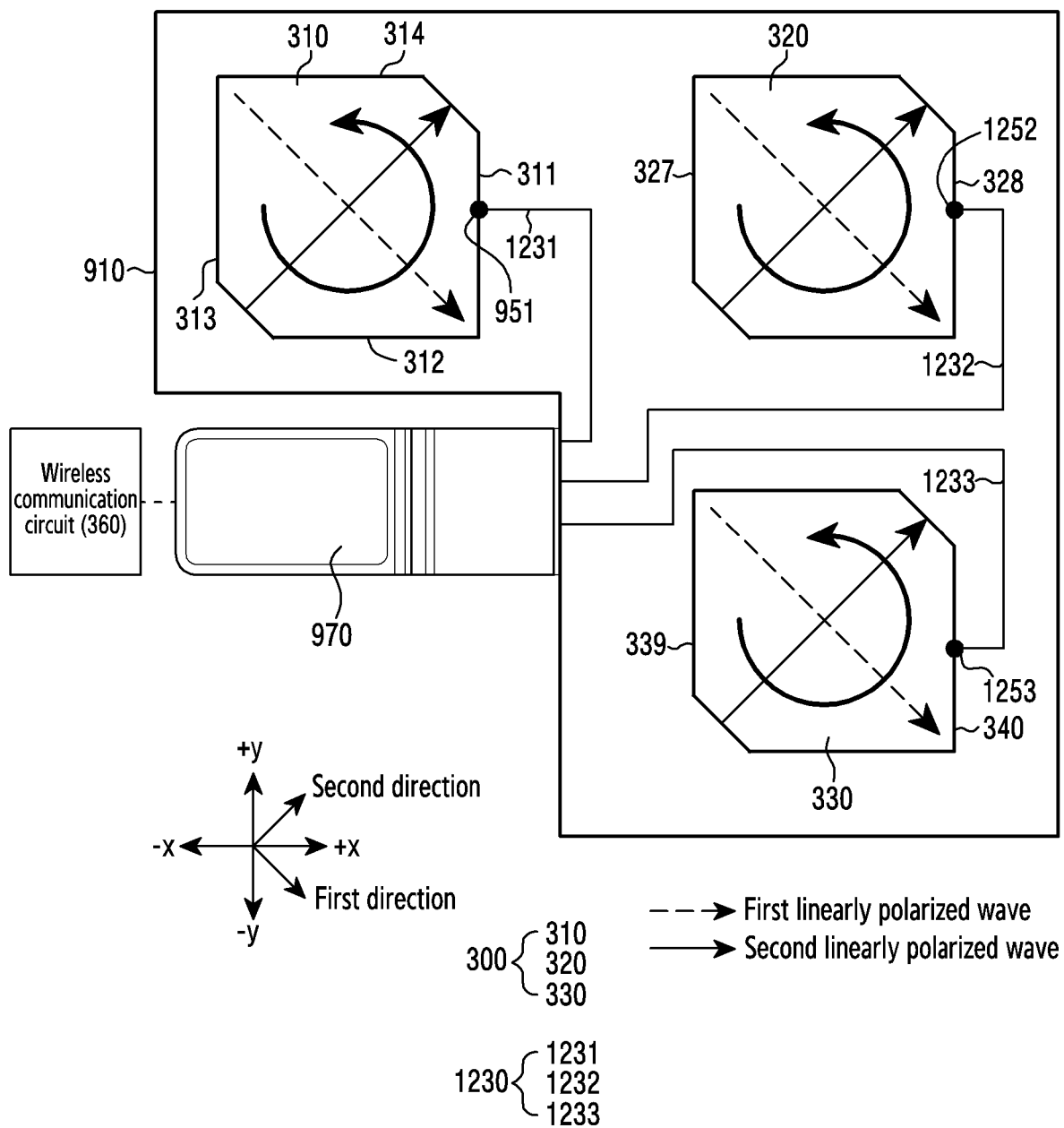
FIG. 12 is a diagram of a wireless communication circuit feeding power to an edge parallel to they axis among edges of each of a plurality of conductive patches according to an embodiment of the disclosure.

FIG. 12 is a diagram of a wireless communication circuit feeding power to an edge parallel to a y axis among edges of each of a plurality of conductive patches according to an embodiment of the disclosure.

Referring to FIG. 12, the electronic device 101 according to an embodiment of the disclosure may include the substrate 910, the wireless communication circuit 360, transmission lines 1230, and/or the plurality of conductive patches 300. FIG. 12 corresponds to an embodiment in which the transmission line 930 of FIG. 9 is replaced with the transmission line 1230, and thus an overlapping description may be omitted.

According to an embodiment of the disclosure, the transmission lines 1230 may include a first transmission line 1231, a second transmission line 1232, and/or a third transmission line 1233.

According to an embodiment of the disclosure, the wireless communication circuit 360 may be electrically connected through the transmission line 1230 to an edge parallel to the y axis among the edges of each of the plurality of conductive patches 300. For example, the wireless communication circuit 360 may be electrically connected to the first edge 311 of the first conductive patch 310 parallel to the y axis through the first transmission line 1231. As another example, the wireless communication circuit 360 may be electrically connected to the eighth edge 328 of the second conductive patch 320 parallel to the y axis through the second transmission line 1232. As another example, the wireless communication circuit 360 may be electrically connected to the tenth edge 340 of the third conductive patch 330 parallel to the y axis through the third transmission line 1233.

Referring to FIG. 12, in comparison with the embodiment of FIG. 9, the wireless communication circuit 360 is electrically connected to the eighth edge 328 of the second conductive patch 320, and the wireless communication circuit 360 is electrically connected to the tenth edge 340 of the third conductive patch 330.

In case that the wireless communication circuit 360 is electrically connected to the eighth edge 328 rather than the seventh edge 327 of the second conductive patch 320, the transmission line may be relatively long, and thus loss caused by the transmission line may be increased. However, even when an antenna is designed as in FIG. 12, signal loss may be a designated size or smaller, and the wireless communication circuit 360 may be required to be electrically connected to the eighth edge 328 of the second conductive patch 320 due to the mounting space, the arrangement of electronic components, or other reasons in the antenna design. Even when the wireless communication circuit 360 is electrically connected to the eighth edge 328 of the second conductive patch 320 at a seventh feeding point 1252, the eight edge is parallel to the first edge 311 of the first conductive patch 310, and thus the directions (e.g., RHCP) of linearly polarized waves and/or circularly polarized waves generated from the first conductive patch 310 and the second conductive patch 320 may be substantially the same.

Therefore, even in the embodiment of FIG. 12, the electronic device 101 may align the directions of linearly polarized waves and/or the directions of circularly polarized waves of the plurality of conductive patches 300, thereby reducing or preventing degradation of UWB communication performance. The seventh feeding point 1252 may correspond to the first point P1 of the first conductive patch 310 in case 1 illustrated in FIG. 6.

Similarly, in case that the wireless communication circuit 360 is electrically connected to the tenth edge 340 rather than the ninth edge 339 of the third conductive patch 330, the transmission line may be relatively long, and thus loss caused by the transmission line may be increased. However, even when an antenna is designed as in FIG. 12, signal loss may be a designated size or smaller, and the wireless communication circuit 360 may be required to be electrically connected to the tenth edge 340 of the third conductive patch 330 due to the mounting space, the arrangement of electronic components, or other reasons in the antenna design. Even when the wireless communication circuit 360 is electrically connected to the tenth edge 340 of the third conductive patch 330 at an eighth feeding point 1253, the tenth edge is parallel to the first edge 311 of the first conductive patch 310, and thus the directions (e.g., RHCP) of linearly polarized waves and/or circularly polarized waves generated from the first conductive patch 310 and the third conductive patch 330 may be substantially the same. Therefore, even in the embodiment of FIG. 12, the electronic device 101 may align the directions of linearly polarized waves and/or circularly polarized waves of the plurality of conductive patches 300, thereby preventing or reducing degradation of UWB communication performance. The eighth feeding point 1253 may correspond to the first point P1 of the first conductive patch 310 in case 1 illustrated in FIG. 6.

Figure 13:
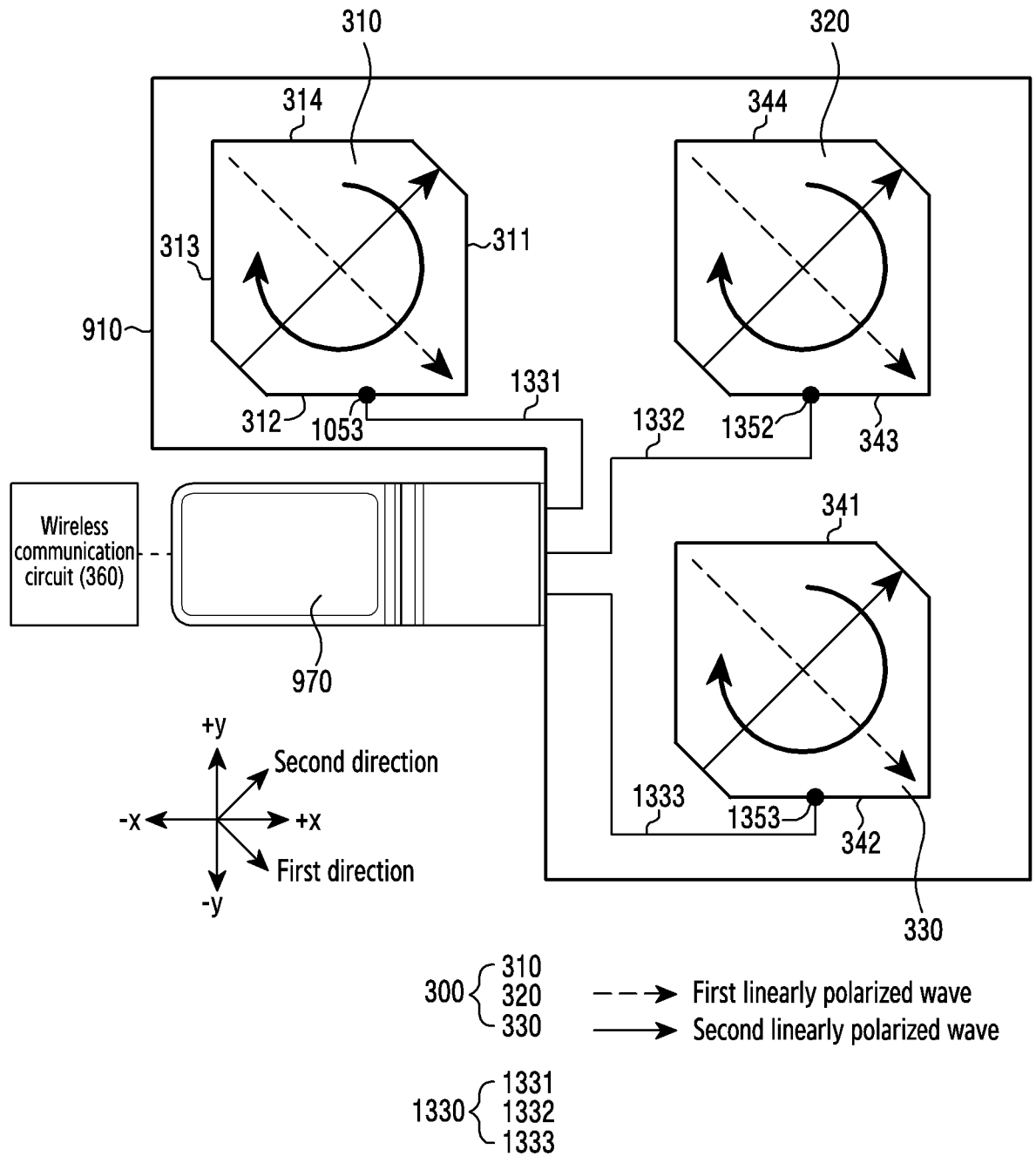
FIG. 13 is a diagram of a wireless communication circuit feeding power to an edge parallel to an x axis among edges of each of a plurality of conductive patches according to an embodiment of the disclosure.

FIG. 13 is a diagram of a wireless communication circuit feeding power to an edge parallel to an x axis among edges of each of a plurality of conductive patches according to an embodiment of the disclosure.

Referring to FIG. 13, the electronic device 101 according to an embodiment of the disclosure may include the substrate 910, the wireless communication circuit 360, transmission lines 1330, and/or the plurality of conductive patches 300. FIG. 13 corresponds to an embodiment in which the transmission line 1030 of FIG. 10 is replaced with the transmission line 1330, and thus an overlapping description may be omitted.

According to an embodiment of the disclosure, the transmission lines 1330 may include a first transmission line 1331, a second transmission line 1332, and/or a third transmission line 1333.

According to an embodiment of the disclosure, the wireless communication circuit 360 may be electrically connected through the transmission line 1330 to an edge parallel to the x axis among the edges of each of the plurality of conductive patches 300. For example, the wireless communication circuit 360 may be electrically connected to the second edge 312 of the first conductive patch 310 parallel to the x axis through the first transmission line 1331. As another example, the wireless communication circuit 360 may be electrically connected to the thirteenth edge 343 of the second conductive patch 320 parallel to the x axis at a ninth feeding point 1352 through a second transmission line 1332. As another example, the wireless communication circuit 360 may be electrically connected to the twelfth edge 342 of the third conductive patch 330 parallel to the x axis at a tenth feeding point 1353 through a third transmission line 1333. The ninth feeding point 1352 may correspond to the second point P2 of the first conductive patch 310 in case 1 illustrated in FIG. 6. The tenth feeding point 1353 may correspond to the second point P2 of the first conductive patch 310 in case 1 illustrated in FIG. 6.

Referring to FIG. 13, in comparison with the embodiment of FIG. 10, the wireless communication circuit 360 is electrically connected to the twelfth edge 342 of the third conductive patch 330.

In case that the wireless communication circuit 360 is electrically connected to the twelfth edge 342 rather than the eleventh edge 341 of the third conductive patch 330, the transmission line may be relatively long, and thus loss caused by the transmission line may be increased. However, even when an antenna is designed as in FIG. 13, signal loss may be a designated size or smaller, and the wireless communication circuit 360 may be required to be electrically connected to the twelfth edge 342 of the third conductive patch 330 due to the mounting space, the arrangement of electronic components, or other reasons in the antenna design. Even when the wireless communication circuit 360 is electrically connected to the twelfth edge 342 of the third conductive patch 330, the twelfth edge is parallel to the second edge 312 of the first conductive patch 310, and thus the directions (e.g., LHCP) of linearly polarized waves and/or circularly polarized waves generated from the first conductive patch 310 and the third conductive patch 330 may be substantially the same. Therefore, even in the embodiment of FIG. 13, the electronic device 101 may align the directions of linearly polarized waves and/or the directions of circularly polarized waves of the plurality of conductive patches 300, thereby preventing or reducing degradation of UWB communication performance.

Figure 14:
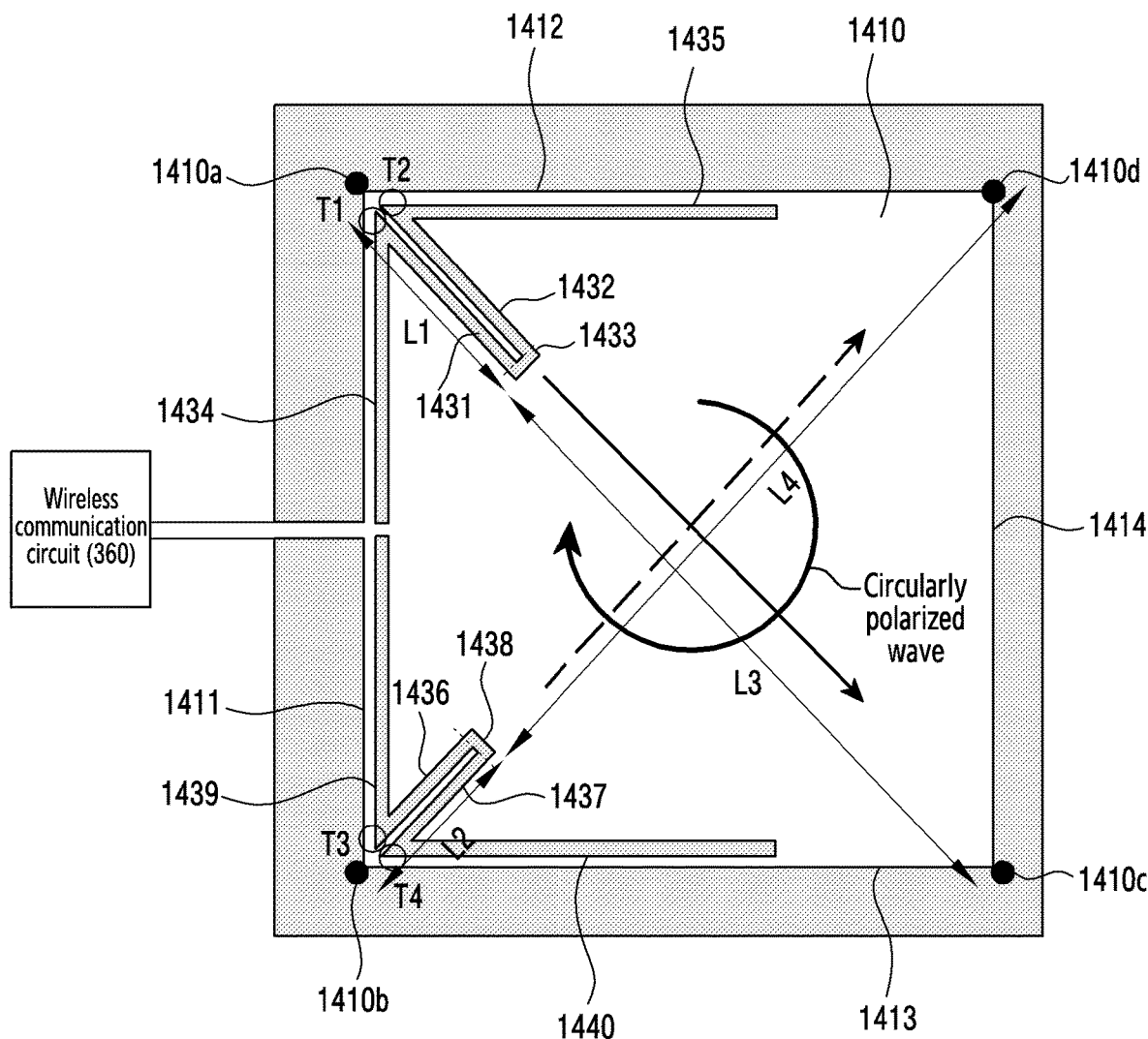
FIG. 14 illustrates a first conductive patch including a first slit structure and a second slit structure according to an embodiment of the disclosure.

FIG. 14 illustrates a first conductive patch including a first slit structure and a second slit structure according to an embodiment of the disclosure.

Referring to FIG. 14, a first conductive patch 1410 according to an embodiment of the disclosure may include a first edge 1411, a second edge 1412 perpendicularly meeting the first edge 1411 at a first corner 1410a, a third edge 1413 perpendicularly meeting the first edge 1411 at a second corner 1410b, and a fourth edge 1414 perpendicularly meeting the third edge at a third corner 1410c. In an embodiment of the disclosure, the fourth edge 1414 may perpendicularly meet the second edge 1412 at a fourth corner 1410d.

According to an embodiment of the disclosure, the first conductive patch 1410 may include a first slit structure 1430 and/or a second slit structure 1450. In an embodiment of the disclosure, the first slit structure 1430 may include a first part 1431 extending from a first point T1 adjacent to the first corner 1410a in a first direction by a first length L1. The first direction may correspond to a diagonal direction with respect to the first corner 1410a. As another example, the first direction may correspond to a direction toward the third corner 1410c from the first corner 1410a.

In an embodiment of the disclosure, the first slit structure 1430 may include a second part 1432 extending from a second point T2 adjacent to the first corner 1410a in the first direction by the first length L1, and a third part 1433 connecting the first part 1432 and the second part 1432. In an embodiment of the disclosure, the first part 1431, the second part 1432, and the third part 1433 of the first slit structure 1430 may be U-shaped.

In addition, the first slit structure 1430 may include a fourth part 1434 lengthily extending along the first edge 1411 in the −y direction, and a fifth part 1435 lengthily extending along the second edge 1412 in the +x direction. In an embodiment of the disclosure, the fourth part 1434 may be connected to the first part 1431, and the fifth part 1435 may be connected to the second part 1432.

In an embodiment of the disclosure, the second slit structure 1450 may include a sixth part 1436 extending from a third point T3 adjacent to the second corner 1410b in a second direction by a second length L2. The second direction may correspond to a diagonal direction with respect to the second corner 1410b. As another example, the second direction may correspond to a direction toward the fourth corner 1410d from the second corner 1410b. In an embodiment of the disclosure, the second slit structure 1450 may include a seventh part 1437 extending from a fourth point T4 adjacent to the second corner 1410b in the second direction by the second length L2, and an eighth part 1438 connecting the sixth part 1436 and the seventh part 1437. In addition, the second slit structure 1450 may include a ninth part 1439 lengthily extending along the first edge 1411 in the +y direction, and a tenth part 1440 lengthily extending along the third edge 1413 in the +x direction. In an embodiment of the disclosure, the ninth part 1439 may be connected to the sixth part 1436, and the tenth part 1440 may be connected to the seventh part 1437. In an embodiment of the disclosure, the second length L2 may be smaller than the first length L1. In an embodiment of the disclosure, the sixth part 1436, the seventh part 1437, and the eighth part 1438 of the second slit structure 1450 may be U-shaped.

According to an embodiment of the disclosure, the wireless communication circuit 360 may feed power to one point of the first edge 1411. The wireless communication circuit 360 may transmit and/or receive a first signal having a first linearly polarized wave generated in parallel to the second direction and a second signal having a second linearly polarized wave generated in parallel to the first direction according to the feeding. In an embodiment of the disclosure, the first signal having the first linearly polarized wave may have a phase of about +45 degrees, and the second signal having the second linearly polarized wave may have a phase of about −45 degrees. According to an embodiment of the disclosure, the wireless communication circuit 360 may transmit and/or receive a third signal having a circularly polarized wave based on the first linearly polarized wave and the second linearly polarized wave. For example, a circularly polarized wave in an LHCP direction may be generated based on the first linearly polarized wave and the second linearly polarized wave, and the wireless communication circuit 360 may transmit and/or receive a third signal, based on the circularly polarized wave in the LHCP direction.

In comparison between the embodiments of FIGS. 13 and 14, even when the first conductive patch 1410 in FIG. 14 having a shape different from that of the first conductive patch 310 in FIG. 13 is used, the electronic device 101 according to an embodiment of the disclosure may generate a signal having a circularly polarized wave, the direction (e.g., LHCP direction) of which is substantially the same as that of a case where the first conductive patch 310 in FIG. 13 is used.

According to an embodiment of the disclosure, the first signal having the first linearly polarized wave may have a frequency band relatively lower than that of the second signal having the second linearly polarized wave. For example, the first length L1 of the first part 1431 of the first slit structure 1430 may be greater than the second length L2 of the fourth part 1444 of the second slit structure 1450. Accordingly, a third length L3 from the third corner 1410c to the first slit structure 1430 may be smaller than a fourth length L4 from the fourth corner 1410d to the second slit structure 1450. Consequently, a first resonant frequency of the first signal having the first linearly polarized wave may be lower than a second resonant frequency of the second signal having the second linearly polarized wave.

Referring to FIG. 14, the first conductive patch 1410 has been illustrated as including the first slit structure 1430 and the second slit structure 1450. However, in an embodiment of the disclosure, the second slit structure 1450 may be omitted. For example, even when the second slit structure 1450 is omitted, the third length L3 to the first slit structure 1430 may be still smaller than the length from the fourth corner 1410d to the second corner 1410b.

In addition, with reference to FIG. 14, the first slit structure 1430 has been described as including the first part 1431, the second part 1432, the third part 1433, the fourth part 1434, and the fifth part 1435. However, in an embodiment of the disclosure, the fourth part 1434 and/or the fifth part 1435 of the first slit structure 1430 may be omitted. As another example, the second slit structure 1450 has been described as including the sixth part 1436, the seventh part 1437, the eighth part 1438, the ninth part 1439, and the tenth part 1440. However, in an embodiment of the disclosure, the ninth part 1439 and/or the tenth part 1440 of the second slit structure 1450 may be omitted.

A slit structure disclosed herein is used to indicate an opening disposed to have a designated length on the first conductive patch 310, is not limited to the term of slits, and may also be referred to as an opening or a slot structure.

Figure 15:
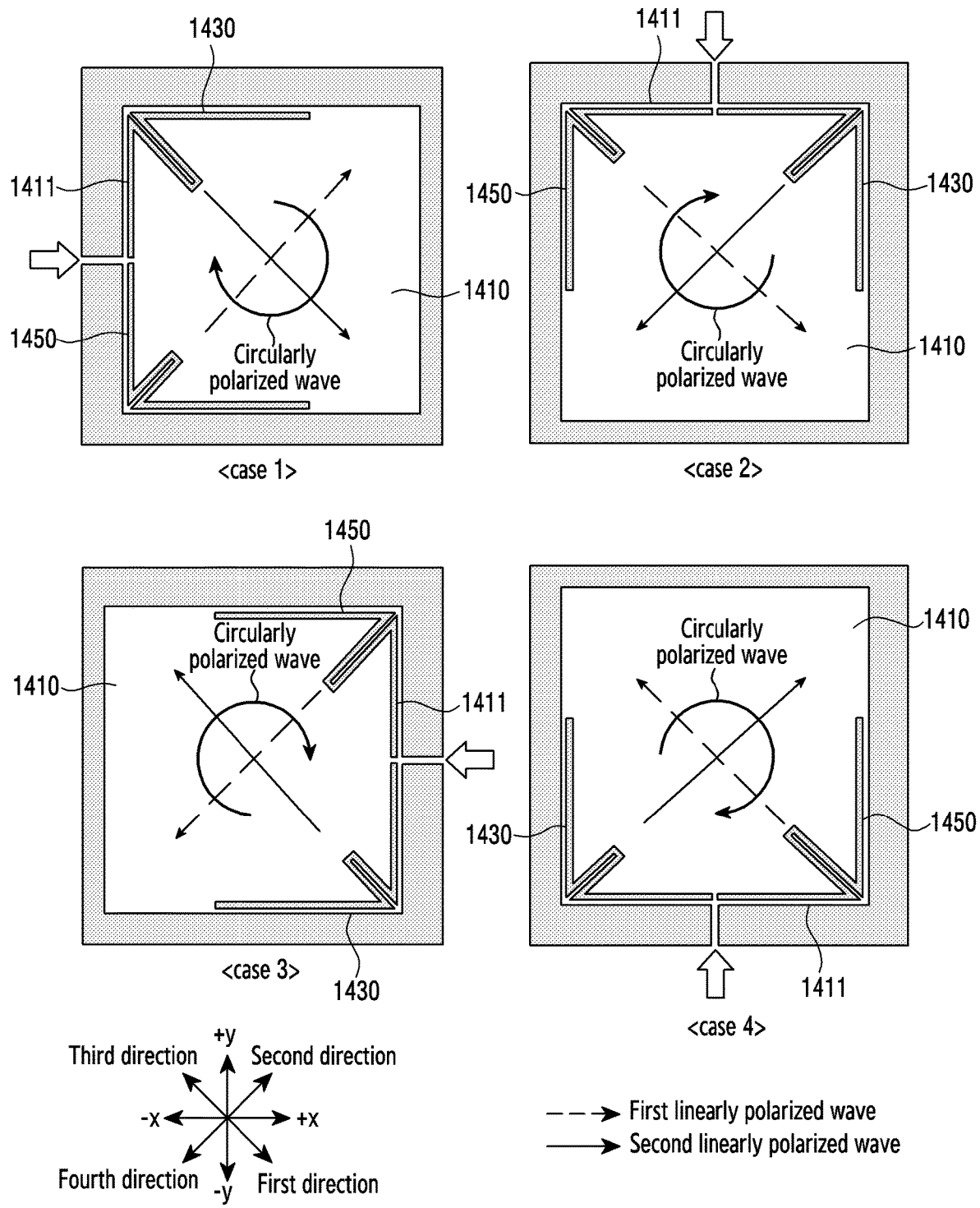
FIG. 15 illustrates a linearly polarized wave direction and/or a circularly polarized wave direction changing according to an orientation of a first conductive patch including a first slit structure and a second slit structure according to an embodiment of the disclosure.

FIG. 15 illustrates a linearly polarized wave direction and/or a circularly polarized wave direction changing according to an orientation of a first conductive patch including a first slit structure and a second slit structure according to an embodiment of the disclosure.

Referring to FIG. 15, the first conductive patch 1410 in case 1 according to an embodiment of the disclosure may be disposed such that the first edge 1411 faces the −x direction. In case 1 according to an embodiment of the disclosure, a first signal having a first linearly polarized wave which is parallel to a second direction and has a phase of +45 degrees, and a second signal having a second linearly polarized wave which is parallel to a first direction and has a phase of −45 degrees may be generated from the first conductive patch 1410 according to feeding. In addition, a circularly polarized wave may have a direction of LHCP. In an embodiment of the disclosure, in case that the positions of the first slit structure 1430 and the second slit structure 1450 are switched, a circularly polarized wave in an RHCP direction may be generated from the first conductive patch 1410.

The first conductive patch 1410 in case 2 according to an embodiment of the disclosure may be disposed such that the first edge 1411 faces the +y direction. The first conductive patch 1410 in case 2 according to an embodiment of the disclosure may correspond to the first conductive patch 1410 in case 1, which has been rotated by +90 degrees. In case 2 according to an embodiment of the disclosure, a first signal having a first linearly polarized wave which is parallel to the first direction and has a phase of −45 degrees, and a second signal having a second linearly polarized wave which is parallel to the second direction and has a phase of +45 degrees may be generated from the first conductive patch 1410 according to feeding. In addition, a circularly polarized wave may have a direction of LHCP.

The first conductive patch 1410 in case 3 according to an embodiment of the disclosure may be disposed such that the first edge 1411 faces the +x direction. The first conductive patch 1401 in case 3 according to an embodiment of the disclosure may correspond to the first conductive patch 1410 in case 1, which has been rotated by +180 degrees. In case 3 according to an embodiment of the disclosure, a first signal having a first linearly polarized wave which is parallel to the first direction and has a phase of −45 degrees, and a second signal having a second linearly polarized wave which is parallel to the second direction and has a phase of +45 degrees may be generated from the first conductive patch 1410 according to feeding. In addition, a circularly polarized wave may have a direction of LHCP.

The first conductive patch 1410 in case 4 according to an embodiment of the disclosure may be disposed such that the first edge 1411 faces the −y direction. The first conductive patch 1410 in case 4 according to an embodiment of the disclosure may correspond to the first conductive patch 1410 in case 1, which has been rotated by +270 degrees. In case 4 according to an embodiment of the disclosure, a first signal having a first linearly polarized wave which is parallel to the second direction and has a phase of +45 degrees, and a second signal having a second linearly polarized wave which is parallel to the first direction and has a phase of −45 degrees may be generated from the first conductive patch 1410 according to feeding. In addition, a circularly polarized wave may have a direction of LHCP.

In comparison between case 1 and case 2 according to an embodiment of the disclosure, in both case 1 and case 2, an LHCP circularly polarized wave may be generated from the first conductive patch 1410. However, the first linearly polarized wave in case 1 may have a phase of +45 degrees and be parallel to the second direction while the first linearly polarized wave in case 2 may have a phase of −45 degrees and be parallel to the first direction. Similarly, the second linearly polarized wave in case 1 may have a phase of −45 degrees and be parallel to the first direction while the second linearly polarized wave in case 2 may have a phase of +45 degrees and be parallel to the second direction. Consequently, linearly polarized waves in different directions may be generated from the first conductive patch 1410 according to the orientation of the first conductive patch 1410. In an embodiment of the disclosure, the orientation of the first conductive patch 1410 may indicate the position or orientation of the first edge 1411 of the first conductive patch 1410. For example, the first edge 1411 of the first conductive patch 1410 in case 1 may face the −x direction, and the first edge 1411 in case 2 may face the +y direction.

In comparison between case 3 and case 4 according to an embodiment of the disclosure, in both case 3 and case 4, an LHCP circularly polarized wave may be generated from the first conductive patch 1410. However, the first linearly polarized wave in case 3 may have a phase of −45 degrees and be parallel to the first direction, and the second linearly polarized wave in case 4 may have a phase of +45 degrees and be parallel to the second direction. Similarly, the second linearly polarized wave in case 3 may have a phase of +45 degrees and be parallel to the second direction, and the second linearly polarized wave in case 4 may have a phase of −45 degrees and be parallel to the first direction. Consequently, linearly polarized waves in different directions may be generated from the first conductive patch 1410 according to the orientation of the first conductive patch 1410. In an embodiment of the disclosure, the orientation of the first conductive patch 1410 may indicate the position or orientation of the first edge 1411 of the first conductive patch 1410. For example, the first edge 1411 of the first conductive patch 1410 in case 3 may face the +x direction, and the first edge 1411 in case 2 may face the −y direction. "The orientation" of the disclosure is replaced by "the arrangement or the position." For example, "the orientation" of the first conductive patch 1410 is replaced by "the arrangement" of the first conductive path 1410.

Figure 16:
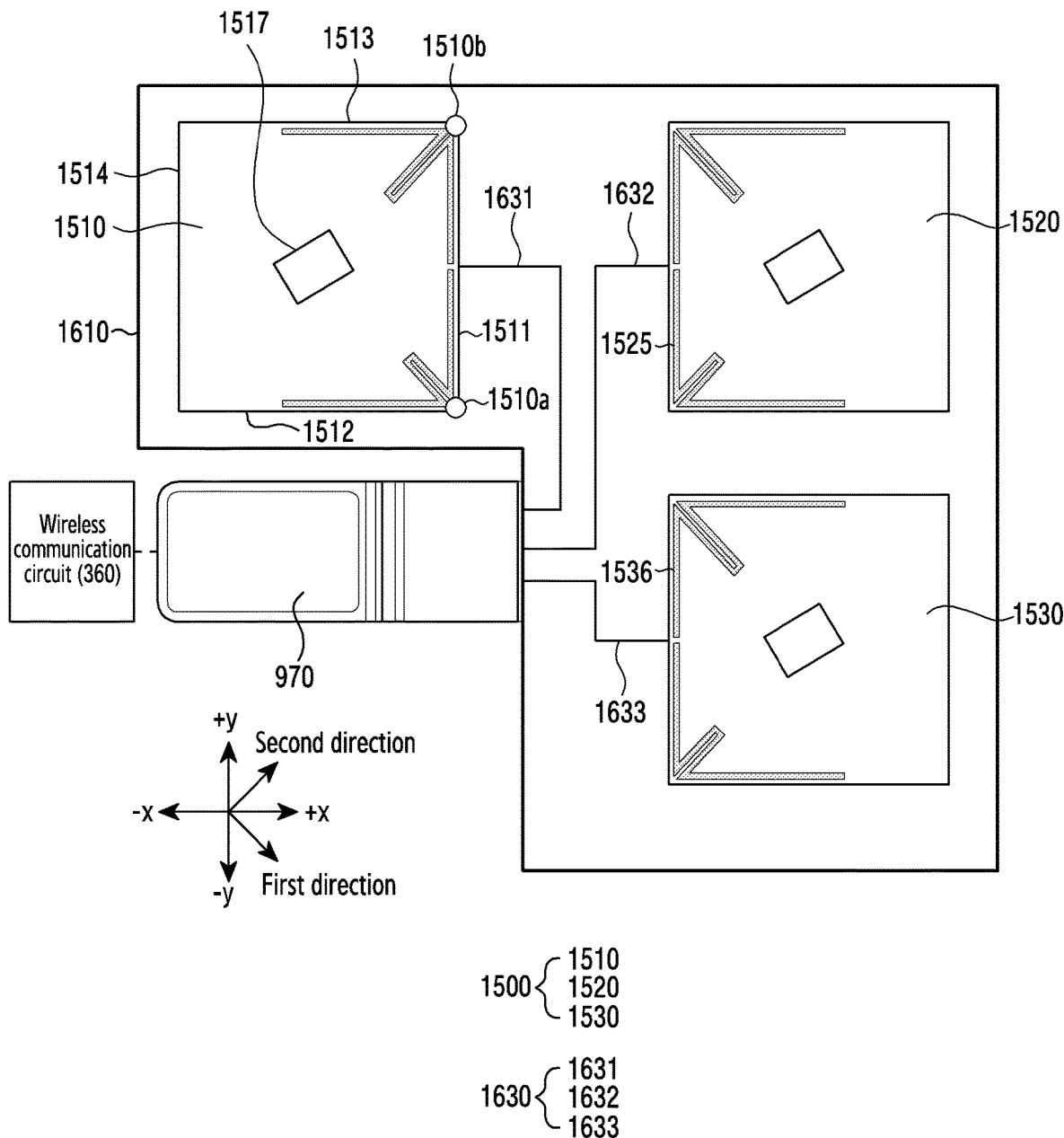
FIG. 16 is a diagram for illustrating a wireless communication circuit feeding power to an edge parallel to a y axis among edges of each of a plurality of conductive patches, to align directions of polarized waves generated from the plurality of conductive patches including a plurality of slit structures according to an embodiment of the disclosure.

FIG. 16 is a diagram for illustrating a wireless communication circuit feeding power to an edge parallel to a y axis among edges of each of a plurality of conductive patches, to align directions of polarized waves generated from the plurality of conductive patches including a plurality of slit structures according to an embodiment of the disclosure.

Referring to FIG. 16, the electronic device 101 according to an embodiment of the disclosure may include a substrate 1610, the wireless communication circuit 360, transmission lines 1630, and/or a plurality of conductive patches 1500. The substrate 1610 according to an embodiment of the disclosure may substantially correspond to the substrate 910 in FIG. 9.

According to an embodiment of the disclosure, the plurality of conductive patches 1500 may include a first conductive patch 1510, a second conductive patch 1520, and/or a third conductive patch 1530. In an embodiment of the disclosure, the first conductive patch 1510 may have a shape further including an additional slit structure 1517 in addition to the first conductive patch 1410 illustrated in FIG. 14. However, the first conductive patch 1510 merely further includes the additional slit structure 1517 compared to the first conductive patch 1410 illustrated in FIG. 14, and the direction of a generated linearly polarized wave and circularly polarized wave may be substantially the same. Therefore, the description for the first conductive patch 1410 given with reference to FIG. 14 may be substantially identically applied to the first conductive patch 1510.

In an embodiment of the disclosure, the second conductive patch 1520 and/or the third conductive patch 1530 may substantially have the same shape as that of the first conductive patch 1510.

According to an embodiment of the disclosure, the first conductive patch 1510 may be disposed such that a first edge 1511 faces the +x direction. The first edge 1511 of the first conductive patch 1510 may substantially correspond to the first edge 1411 of the first conductive patch 1410 in FIG. 14. In an embodiment of the disclosure, the second conductive patch 1520 may be disposed such that a fifth edge 1525 corresponding to the first edge 1511 of the first conductive patch 1510 faces the −x direction. Consequently, the first edge 1511 of the first conductive patch 1510 may face the fifth edge 1525 of the second conductive patch 1520. In an embodiment of the disclosure, the third conductive patch 1530 may be disposed such that a sixth edge 1536 corresponding to the first edge 1511 of the first conductive patch 1510 faces the −x direction.

According to an embodiment of the disclosure, the transmission lines 1630 may include a first transmission line 1631, a second transmission line 1632, and/or a third transmission line 1633.

According to an embodiment of the disclosure, the wireless communication circuit 360 may be electrically connected through the transmission lines 1630 to edges of the plurality of conductive patches 1500 parallel to the y axis. For example, the wireless communication circuit 360 may be electrically connected to the first edge 1511 of the first conductive patch 1510 through the first transmission line 1631. As another example, the wireless communication circuit 360 may be electrically connected to the fifth edge 1525 of the second conductive patch 1520 through the second transmission line 1632. As another example, the wireless communication circuit 360 may be electrically connected to the sixth edge 1536 of the third conductive patch 1530 through the third transmission line 1633.

According to an embodiment of the disclosure, the wireless communication circuit 360 may feed power to edges of the plurality of conductive patches 1500 parallel to the y axis, thereby aligning the directions of linearly polarized waves and the directions of circularly polarized waves generated from the plurality of conductive patches 1500. Consequently, the electronic device 101 may reduce or prevent deterioration of UWB communication performance according to aligning of the directions of linearly polarized waves and/or circularly polarized waves generated from the plurality of conductive patches 1500.

Figure 17:
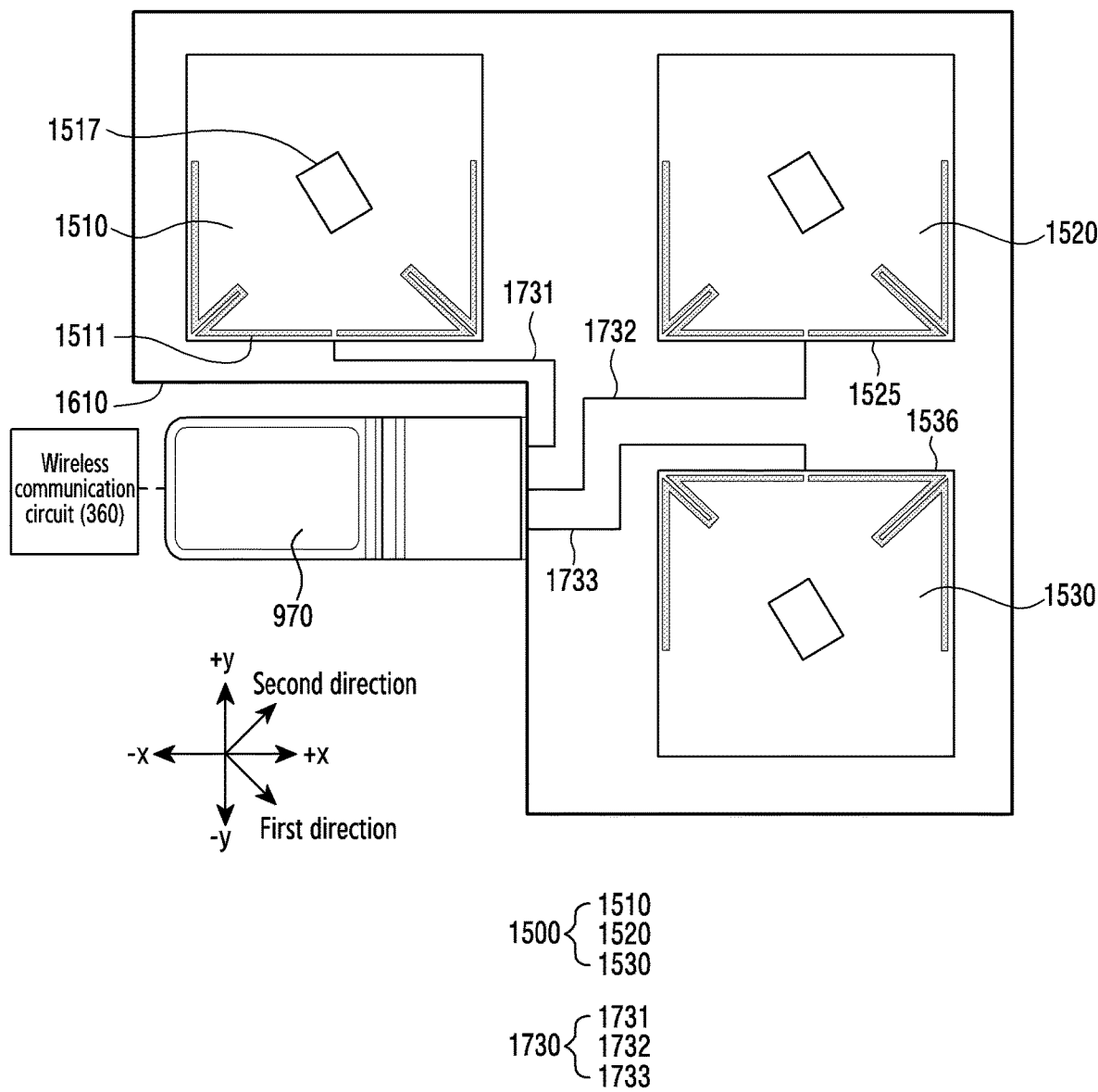
FIG. 17 is a diagram for illustrating a wireless communication circuit feeding power to an edge parallel to an x axis among edges of each of a plurality of conductive patches, to align directions of polarized waves generated from a plurality of conductive patches including a plurality of slit structures according to an embodiment of the disclosure.

FIG. 17 is a diagram for illustrating a wireless communication circuit feeding power to an edge parallel to an x axis among edges of each of a plurality of conductive patches, to align directions of polarized waves generated from a plurality of conductive patches including a plurality of slit structures according to an embodiment of the disclosure.

Referring to FIG. 17, the electronic device 101 according to an embodiment of the disclosure may include the substrate 1610, the wireless communication circuit 360, transmission lines 1730, and/or the plurality of conductive patches 1500. The substrate 1610 according to an embodiment of the disclosure may substantially correspond to the substrate 910 in FIG. 9.

According to an embodiment of the disclosure, the plurality of conductive patches 1500 may include the first conductive patch 1510, the second conductive patch 1520, and/or the third conductive patch 1530.

According to an embodiment of the disclosure, the first conductive patch 1510 may be disposed such that the first edge 1511 faces the −y direction. The first edge 1511 of the first conductive patch 1510 may substantially correspond to the first edge 1411 of the first conductive patch 1410 in FIG. 14. In an embodiment of the disclosure, the second conductive patch 1520 may be disposed such that the fifth edge 1525 corresponding to the first edge 1511 of the first conductive patch 1510 faces the −y direction. In an embodiment of the disclosure, the third conductive patch 1530 may be disposed such that the sixth edge 1536 corresponding to the first edge 1511 of the first conductive patch 1510 faces the +y direction. Consequently, the fifth edge 1525 of the second conductive patch 1520 may face the sixth edge 1536 of the third conductive patch 1530.

According to an embodiment of the disclosure, the transmission lines 1730 may include a first transmission line 1731, a second transmission line 1732, and/or a third transmission line 1733.

According to an embodiment of the disclosure, the wireless communication circuit 360 may be electrically connected through the transmission lines 1730 to edges of the plurality of conductive patches 1500 parallel to the x axis. For example, the wireless communication circuit 360 may be electrically connected to the first edge 1511 of the first conductive patch 1510 through the first transmission line 1731. As another example, the wireless communication circuit 360 may be electrically connected to the fifth edge 1525 of the second conductive patch 1520 through the second transmission line 1732. As another example, the wireless communication circuit 360 may be electrically connected to the sixth edge 1536 of the third conductive patch 1530 through the third transmission line 1733.

According to an embodiment of the disclosure, the wireless communication circuit 360 may feed power to edges of the plurality of conductive patches 1500 parallel to the x axis, thereby aligning the directions of linearly polarized waves and the directions of circularly polarized waves generated from the plurality of conductive patches 1500. Consequently, the electronic device 101 may reduce or prevent deterioration of UWB communication performance according to aligning of the directions of linearly polarized waves and/or circularly polarized waves generated from the plurality of conductive patches 1500.

Figure 18:
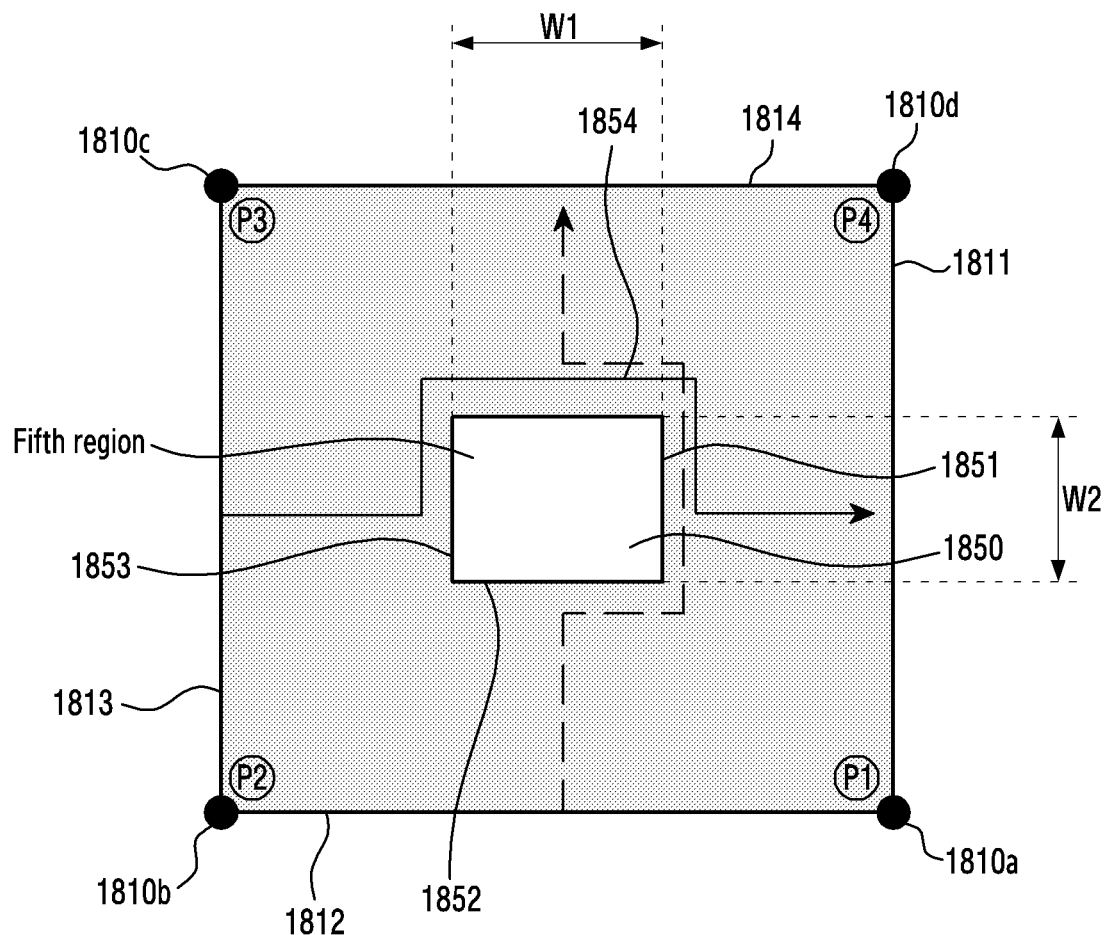
FIG. 18 is a diagram illustrating a first conductive patch including a rectangular slit according to an embodiment of the disclosure.

FIG. 18 is a diagram illustrating a first conductive patch including a rectangular slit according to an embodiment of the disclosure.

Referring to FIG. 18, the electronic device 101 according to an embodiment of the disclosure may include a first conductive patch 1810. In an embodiment of the disclosure, the first conductive patch 1810 may include a first edge 1811, a second edge 1812, a third edge 1813, and/or a fourth edge 1814. For example, the first conductive patch 1810 may include the first edge 1811 and the second edge 1812 meeting the first edge 1811 at a first corner 1810*a*. The first conductive patch 1810 may include the third edge 1813 meeting the second edge 1813 at a second corner 1810*b*, and the fourth edge 1814 meeting the third edge 1813 at a third corner 1810*c*. In an embodiment of the disclosure, the fourth edge 1814 may meet the first edge 1811 at a fourth corner 1810*d*.

According to an embodiment of the disclosure, the first edge 1811 and the second edge 1812 may be substantially perpendicular to each other. According to an embodiment of the disclosure, the third edge 1813 and the fourth edge 1814 may be substantially perpendicular to each other. In an embodiment of the disclosure, the first conductive patch 1810 may have a square shape.

According to an embodiment of the disclosure, the first conductive patch 1810 may include a first slit structure 1850 disposed therethrough. For example, the first slit structure 1850 may include a first slit edge 1851 parallel to the first edge 1811 of the first conductive patch 1810, a second slit edge 1852 parallel to the second edge 1812, a third slit edge 1853 parallel to the third edge 1813, and/or a fourth slit edge 1854 parallel to the fourth edge 1814.

According to an embodiment of the disclosure, the first slit structure 1850 of the first conductive patch 1810 may have a first width W1 in a direction parallel to the x axis, and the first slit structure 1850 may have a second width W2 smaller than the first width W1 in a direction parallel to the y axis.

In the above description, the shape of the first conductive patch 1810 according to an embodiment has been expressed based on edges, but the shape of the first conductive patch 1810 may be expressed in various other methods. For example, the first conductive patch 1810 may be expressed to have a shape obtained by removing one region from a quadrangular shape. For example, the first conductive patch 1810 may correspond to a shape obtained by removing a fifth region from a quadrangular shape. The fifth region may have a rectangular shape.

According to an embodiment of the disclosure, the wireless communication circuit 360 may feed power to one point adjacent to a corner of the first conductive patch 1810 to transmit and/or receive a signal having a designated frequency band. For example, the wireless communication circuit 360 may feed power to a first point P1 adjacent to the first corner 1810a of the first conductive patch 1810. As another example, the wireless communication circuit 360 may feed power to a second point P2 adjacent to the second corner 1810b. As another example, the wireless communication circuit 360 may feed power to a third point P3 adjacent to the third corner 1810c. As another example, the wireless communication circuit 360 may feed power to a fourth point P4 adjacent to the fourth corner 1810d.

According to an embodiment of the disclosure, a first signal having a first linearly polarized wave and/or a second signal having a second linearly polarized wave may be generated on the first conductive patch 1810 according to feeding of power by the wireless communication circuit 360 through the first point P1, the second point P2, the third point P3, or the fourth point P4 of the first conductive patch 1810. For example, the first linearly polarized wave may correspond to a vertically polarized wave, and the second linearly polarized wave may correspond to a horizontally polarized wave. The first signal having the first linearly polarized wave and the second signal having the second linearly polarized wave may have a phase difference of about 90 degrees.

According to an embodiment of the disclosure, in case that the first conductive patch 1810 is disposed such that the first slit edge 1851 of the first slit structure 1850 is parallel to the y axis, when the wireless communication circuit 360 feeds power to the first point P1 adjacent to the first corner 1810a of the first conductive patch 1810 or the third point P3 adjacent to the third corner 1810c, a circularly polarized wave in an LHCP direction may be generated on the first conductive patch 1810. According to an embodiment of the disclosure, in case that the first conductive patch 1810 is disposed such that the first slit edge 1851 is parallel to the y axis, when the wireless communication circuit 360 feeds power to the second point P2 adjacent to the second corner 1810b of the first conductive patch 1810 or the fourth point P4 adjacent to the fourth corner 1810d, a circularly polarized wave in a RHCP direction may be generated on the first conductive patch 1810. Consequently, in case that the first conductive patch 1810 is disposed such that the first slit edge 1851 is parallel to the y axis, when the wireless communication circuit 360 feeds power to one point (e.g., the first point P1 or the third point P3) adjacent to a corner (e.g., the first corner 1810a or the third corner 1810c) positioned along a third axis, a circularly polarized wave in an LHCP direction may be generated. In addition, when the wireless communication circuit 360 feeds power to a corner (e.g., the second corner 1810b or the fourth corner 1810d) positioned along a fourth axis, a circularly polarized wave in a RHCP direction may be generated. Consequently, the direction of a circularly polarized wave may be different according to a feeding point of the first conductive patch 1810.

The first linearly polarized wave of the first conductive patch 1810 in the disclosure may be referred to as a polarized wave having a relatively low frequency band compared to that of the second linearly polarized wave. For example, the first slit structure 1850 of the first conductive patch 1810 may have the first width W1 greater than the second width W2. Accordingly, a signal having a linearly polarized wave crossing over the first conductive patch 1810 in the +x direction may correspond to a frequency band lower than that of a signal having a linearly polarized wave crossing over the first conductive patch 1810 in the +y direction. A linearly polarized wave in a first direction having a relatively low frequency band may be referred to as a first linearly polarized wave. A linearly polarized wave in a second direction having a relatively high frequency band may be referred to as a second linearly polarized wave.

With reference to FIG. 18, the first slit structure 1850 has been described as being disposed through the first conductive patch 1810, but this may also be described in a concept that the first conductive patch 1810 includes the first slit structure 1850. In addition, the first slit structure 1850 merely corresponds to a term used to indicate an opening disposed through the first conductive patch 1810, and may also be referred to as a first opening or a first slot structure.

With reference to FIG. 18, the first slit structure 1850 has been described as including the first slit edge 1851, the second slit edge 1852, the third slit edge 1853, and/or the fourth slit edge 1854 which are parallel to the respective edges of the first conductive patch 1810. However, this is for convenience of explanation, and it may also be described that the first slit edge 1851 is a fifth edge of the first conductive patch 1810, the second slit edge 1852 is a sixth edge of the first conductive patch 1810, the third slit edge 1853 is a seventh edge of the first conductive patch 1810, and/or the fourth slit edge 1854 is an eight edge of the first conductive patch 1810.

Figure 19:
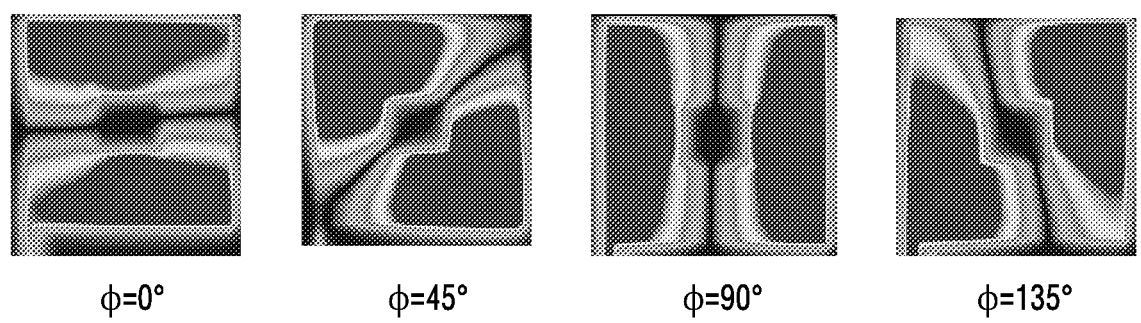
FIG. 19 is a diagram illustrating a direction of a circularly polarized wave generated when a wireless communication circuit feeds power to a third point of a first conductive patch illustrated in FIG. 18 according to an embodiment of the disclosure.
Figure 19:
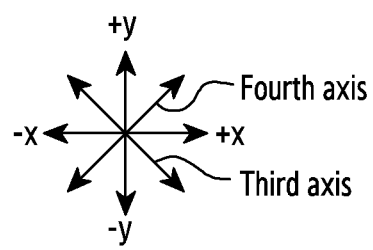

FIG. 19 is a diagram illustrating a direction of a circularly polarized wave generated when a wireless communication circuit feeds power to a third point of a first conductive patch illustrated in FIG. 18 according to an embodiment of the disclosure.

Referring to FIG. 19, it may be noted that RHCP is generated as a circularly polarized wave generate from the first conductive patch 1810 according to feeding of power to the second point P2 of the first conductive patch 1810 by the wireless communication circuit 360 according to an embodiment.

Figure 20:
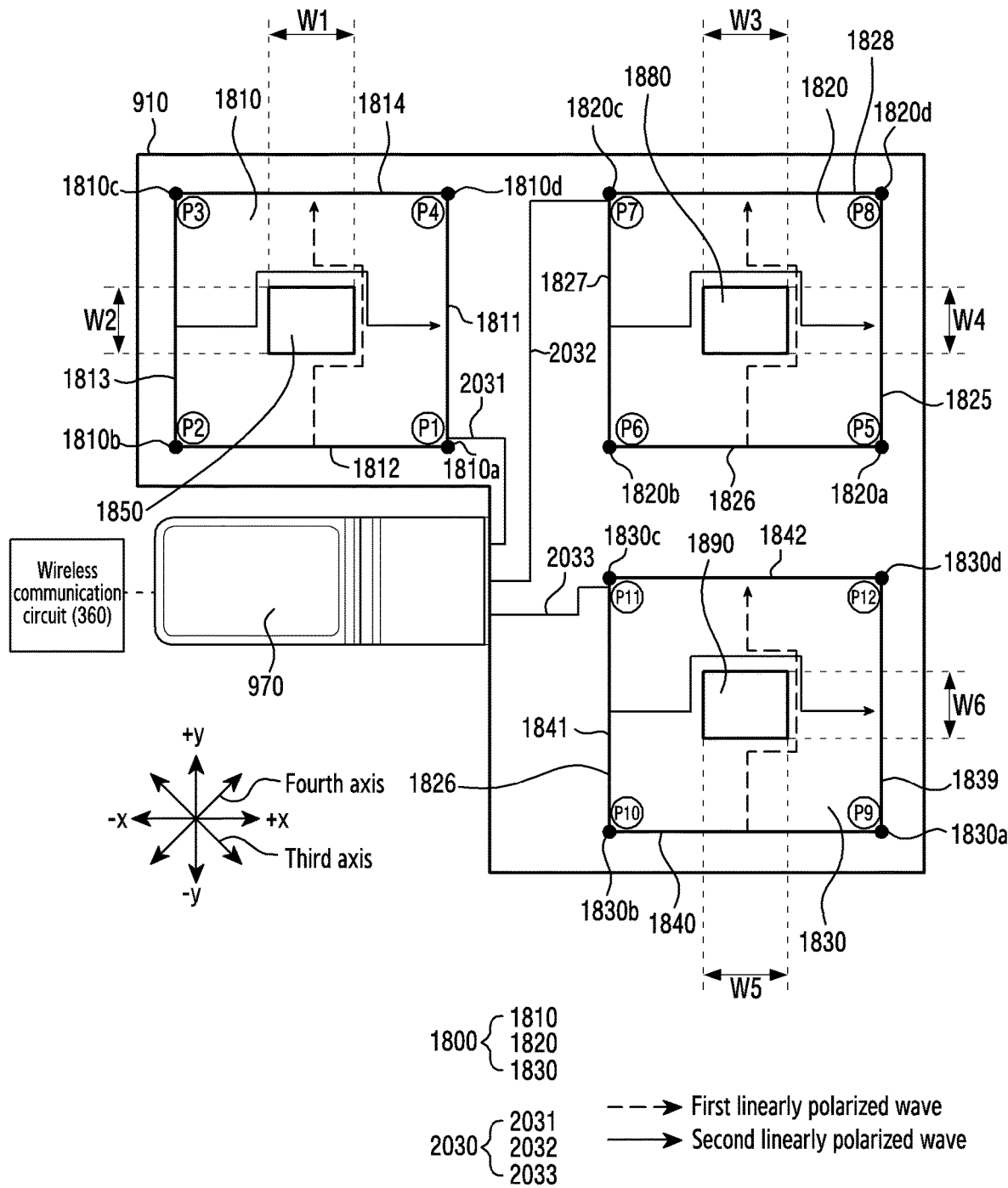
FIG. 20 is a diagram for illustrating a wireless communication circuit feeding power to a point adjacent to a corner for each of a plurality of conductive patches, to align directions of polarized waves generated from a plurality of conductive patches according to an embodiment of the disclosure.

FIG. 20 is a diagram for illustrating a wireless communication circuit feeding power to a point adjacent to a corner for each of a plurality of conductive patches, to align directions of polarized waves generated from a plurality of conductive patches according to an embodiment of the disclosure.

Referring to FIG. 20, the electronic device 101 according to an embodiment of the disclosure may include the substrate 910, the wireless communication circuit 360, transmission lines 2030, and/or the plurality of conductive patches 300.

According to an embodiment of the disclosure, the plurality of conductive patches 1800 may include the first conductive patch 1810, the second conductive patch 1820, and/or the third conductive patch 1830. In an embodiment of the disclosure, the second conductive patch 1820 and/or the third conductive patch 1830 may have substantially the same shape as that of the first conductive patch 310. For example, the second conductive patch 1820 and/or the third conductive patch 1830 may have a shape obtained by removing the fifth region having a rectangular shape from a quadrangular shape, similar to the first conductive patch 1810 described with reference to FIG. 18.

According to an embodiment of the disclosure, the second conductive patch 1820 may include a fifth edge 1825, a sixth edge 1826 meeting the fifth edge 1825 at a fifth corner 1820a, a seventh edge 1827 meeting the sixth edge 1826 at a sixth corner 1820b, and/or an eighth edge 1828 meeting the seventh edge 1827 at a seventh corner 1820c. The eighth edge 1828 may meet the fifth edge 1825 at an eighth corner 1820d. In an embodiment of the disclosure, the second conductive patch 1820 may include a second slit structure 1880 disposed therethrough. The second slit structure 1880 may have substantially the same shape and/or the same size as that of the first slit structure 1850.

According to an embodiment of the disclosure, the third conductive patch 1830 may include a ninth edge 1839, a tenth edge 1840 meeting the ninth edge 1839 at a ninth corner 1830a, an eleventh edge 1841 meeting the tenth edge 1840 at a tenth corner 1830b, and/or a twelfth edge 1842 meeting the eleventh edge 1841 at an eleventh corner 1830c. The twelfth edge 1842 may meet the ninth edge 1839 at a twelfth corner 1830d. In an embodiment of the disclosure, the third conductive patch 1830 may include a third slit structure 1890 disposed therethrough. The third slit structure 1889 may have substantially the same shape and/or the same size as that of the first slit structure 1850.

According to an embodiment of the disclosure, the plurality of conductive patches 300 may be substantially identically oriented. For example, the first slit structure 1850 of the first conductive patch 1810 may be disposed to have a first width W1 in the x axis direction and a second width W2 smaller than the first width W1 in the y axis direction. In an example, the second conductive patch 320 may be disposed to have a third width W3 in the x axis direction and a fourth width W4 smaller than the third width W3 in the y axis direction. The third conductive patch 330 may be disposed to have a fifth width W5 in the x axis direction and a sixth width W6 smaller than the fifth width W5 in they axis direction. Consequently, the plurality of conductive patches 300 may be substantially identically oriented.

According to an embodiment of the disclosure, the plurality of conductive patches 1800 may be arranged to be spaced apart from each other along a designated axis. For example, the second conductive patch 1820 may be disposed to be spaced apart from the first conductive patch 1810 along a first axis (e.g., x axis). The third conductive patch 1830 may be disposed to be spaced apart from the second conductive patch 1820 along a second axis (e.g., y axis). In an embodiment of the disclosure, the first axis and the second axis have been described as being substantially perpendicular to each other. However, the first axis along which the first conductive patch 1810 and the second conductive patch 1820 are arranged and the second axis along which the second conductive patch 1820 and the third conductive patch 1830 are arranged may make various angles.

According to an embodiment of the disclosure, when the plurality of conductive patches 1800 have the same orientation, the wireless communication circuit 360 may feed power through the transmission line 2030 to one point adjacent to a corner which is positioned along a third axis and allows minimization of the length of the transmission line 2030, among the corners of each of the plurality of conductive patches 1800. For example, the wireless communication circuit 360 may feed power to a first point P1 adjacent to the first corner 1810a of the first conductive patch 1810 through a first transmission line 2031. The first corner 1810a and the third corner 1810c correspond to corners positioned along the third axis among the corners of the first conductive patch 1810. However, a corner allowing minimization of the length of the first transmission line 2031 may correspond to the first corner 1810a. Therefore, the wireless communication circuit 360 may feed power to a first point P1 adjacent to the first corner 1810a through a first transmission line 2031. The electronic device 101 may minimize the length of the first transmission line 2031, thereby reducing loss caused by signal transmission.

As another example, the wireless communication circuit 360 may feed power to a seventh point P7 adjacent to the seventh corner 1820c of the second conductive patch 1820 through a second transmission line 2032. The fifth corner 1820a and the seventh corner 1820c correspond to corners positioned along the third axis among the corners of the second conductive patch 1820. However, a corner allowing minimization of the length of the second transmission line 2032 may correspond to the seventh corner 1820c. Therefore, the wireless communication circuit 360 may feed power to the seventh point P7 adjacent to the seventh corner 1820c through the second transmission line 2032. The electronic device 101 may minimize the length of the second transmission line 2032, thereby reducing loss caused by signal transmission.

As another example, the wireless communication circuit 360 may feed power to an eleventh point P11 adjacent to the eleventh corner 1830c of the third conductive patch 1830 through a third transmission line 2033. The ninth corner 1830a and the eleventh corner 1830c correspond to corners positioned along the third axis among the corners of the third conductive patch 1830. However, a corner allowing minimization of the length of the third transmission line 2033 may correspond to the eleventh corner 1830c. Therefore, the wireless communication circuit 360 may feed power to the eleventh point P11 adjacent to the eleventh corner 1830c through the third transmission line 2033. The electronic device 101 may minimize the length of the third transmission line 2033, thereby reducing loss caused by signal transmission.

According to an embodiment of the disclosure, in case that the plurality of conductive patches 1800 are arranged to have substantially the same orientation, the wireless communication circuit 360 may feed power to a corner positioned along a designated axis (e.g., the third axis or the fourth axis) among the corners of each of the plurality of conductive patches 1800, thereby aligning the directions of circularly polarized waves. For example, the wireless communication circuit 360 may feed power to the first point P1 of the first conductive patch 1810 and feed power to a sixth point P6 of the second conductive patch 1820. A circularly polarized wave in an LHCP direction may be generated from the first conductive patch 1810, and a circularly polarized wave in an RHCP direction may be generated from the second conductive patch 1820. If the directions of circularly polarized waves generated from the first conductive patch 1810 and the second conductive patch 1820 are different, the performance of the electronic device 101 in UWB communication may deteriorate. On the contrary, if the wireless communication circuit 360 according to an embodiment feeds power to the first point P1 of the first conductive patch 1810 and the seventh point P7 of the second conductive patch 1820, circularly polarized waves in an LHCP direction may be generated from the first conductive patch 1810 and the second conductive patch 1820. Therefore, the electronic device 101 may align the directions of circularly polarized waves generated from each of the plurality of conductive patches 1800, thereby reducing or preventing deterioration of performance during UWB communication.

According to an embodiment of the disclosure, the plurality of conductive patches 1800 are arranged to have substantially the same orientation, and thus the electronic device 101 may align the directions of linearly polarized waves and/or the directions of circularly polarized waves generated from each of the plurality of conductive patches 1800. For example, unlike the illustration in FIG. 18, a case where the second conductive patch 1820 is rotated by +90 degrees may be assumed. The fifth edge 1825 of the second conductive patch 1820 rotated by +90 degrees may be disposed in parallel to the x axis. The wireless communication circuit 360 may feed power to the first point P1 of the first conductive patch 1810 through the first transmission line 2031, and feed power to a fifth point P5 of the second conductive patch 1820 rotated by +90 degrees through an additional transmission line. A first linearly polarized wave crossing over the first conductive patch 1810 in the +y direction and a second linearly polarized wave crossing over the second conductive patch 1810 in the +z direction may be generated from the first conductive patch 1810. A third linearly polarized wave crossing over the second conductive patch 1820 in the +x direction and a fourth linearly polarized wave crossing over the second conductive patch 1820 in the +y direction may be generated from the second conductive patch 1820. Consequently, the direction of the first linearly polarized wave may be different from the direction of the third linearly polarized wave corresponding to the first linearly polarized wave, and the direction of the second linearly polarized wave may be different from the direction of the fourth linearly polarized wave corresponding to the second linearly polarized wave. The performance of the electronic device 101 in UWB communication may deteriorate due to the difference between the directions of linearly polarized waves generated from the first conductive patch 1810 and the second conductive patch 1820.

On the contrary, when the first width W1 of the first conductive patch 1810 according to an embodiment is disposed in parallel to the x axis and the third width W3 of the second conductive patch 1820 is disposed in parallel to the x axis, the directions of linearly polarized waves generated from the first conductive patch 1810 and the second conductive patch 1820 may coincide with each other. Consequently, the electronic device 101 may align the directions of linearly polarized waves and/or circularly polarized waves generated from the plurality of conductive patches 300, thereby reducing or preventing deterioration of UWB communication performance.

The electronic device 101 according to an embodiment of the disclosure may include: a plurality of conductive patches 300 including the first conductive patch 310, the second conductive patch 320 disposed to be spaced apart from the first conductive patch 310 along a first axis, and the third conductive patch 330 disposed to be spaced apart from the second conductive patch 320 along a second axis; and the wireless communication circuit 360 positioned in a direction crossing between the first conductive patch 310 and the third conductive patch 330 from the second conductive patch 320. The first conductive patch 310 may include the first edge 311 facing the second conductive patch 320, the second edge 312 perpendicularly meeting the first edge 311 at the first corner 310*a*, the third edge 313 parallel to the first edge 311, and the fourth edge 314 that is parallel to the second edge 312 and perpendicularly meets the third edge 313 at the second corner 310*b*. The first conductive patch may have a first width W1 in a first direction from the first corner 310*a* to the second corner 310*b*. The first conductive patch may have a second width W2 smaller than the first width in a second direction perpendicular to the first direction. The second conductive patch 320 and the third conductive patch 330 may each have a shape substantially identical to that of the first conductive patch 310. The wireless communication circuit 360 may be configured to feed power to a first point of the first edge 311 of the first conductive patch 310, a second point of a fifth edge of the second conductive patch 320 facing the first edge 311, and a third point of a sixth edge of the third conductive patch 330 relatively adjacent to the first conductive patch 310 among edges of the third conductive patch 330 parallel to the fifth edge. The wireless communication circuit 360 may be configured to transmit and/or receive a signal having a first frequency band through linearly polarized waves generated in an identical direction and circularly polarized waves generated in an identical direction from each of the plurality of conductive patches 300 according to the feeding.

According to an embodiment of the disclosure, the linearly polarized wave may include a first linearly polarized wave parallel to the first direction and a second linearly polarized wave parallel to the second direction, which are generated from each of the plurality of conductive patches according to the feeding. The circularly polarized wave may be based on the first linearly polarized wave and the second linearly polarized wave.

According to an embodiment of the disclosure, a signal having the first linearly polarized wave may correspond to a second frequency band, and a signal having the second linearly polarized wave may correspond to a third frequency band. The first frequency band may correspond to a frequency band in which the second frequency band and the third frequency band overlap with each other.

According to an embodiment of the disclosure, the first frequency band may include a frequency band of 6.7-6.75 GHz.

According to an embodiment of the disclosure, the first axis in which the first conductive patch and the second conductive patch are arranged and the second axis in which the second conductive patch and the third conductive patch are arranged may be substantially perpendicular to each other.

According to an embodiment of the disclosure, the first conductive patch and the second conductive patch may be spaced a first gap apart from each other. The second conductive patch and the third conductive patch may be spaced a second gap apart from each other.

According to an embodiment of the disclosure, the circularly polarized wave may correspond to right-handed circular polarization (RHCP) or left-handed circular polarization (LHCP).

According to an embodiment of the disclosure, the wireless communication circuit is electrically connected to the plurality of conductive patches through a microstrip.

According to an embodiment of the disclosure, the plurality of conductive patches are arranged toward a rear surface of the electronic device.

According to an embodiment of the disclosure, the second conductive patch may have a third width in the first direction and a fourth width smaller than the third width in the second direction. The third conductive patch may have a fifth width in the first direction and a sixth width smaller than the fifth width in the second direction.

According to an embodiment of the disclosure, the first conductive patch further includes: a seventh edge extending from one end of the first edge in the second direction and meeting one end of the fourth edge; and an eighth edge extending from one end of the second edge in the second direction and meeting one end of the third edge.

According to an embodiment of the disclosure, the first conductive patch may further include a seventh edge connecting the first edge and the fourth edge and an eighth edge connecting the second edge and the third edge. According to an embodiment of the disclosure, the seventh edge may include a first part extending from one end of the first edge toward the third edge, and a second part extending from the first part toward the fourth edge and meeting the fourth edge. According to an embodiment of the disclosure, the eighth edge may include a third part extending from one end of the second edge toward the fourth edge, and a fourth part extending from the third part toward the second edge and meeting the second edge.

The electronic device according to an embodiment of the disclosure may further include a flexible printed circuit board (FPCB) on which the plurality of conductive patches are arranged.

According to an embodiment of the disclosure, the FPCB may include a first layer on which the plurality of conductive patches are arranged and a second layer including a ground.

According to an embodiment of the disclosure, the wireless communication circuit may be configured to, based on a signal received from an external device by using at least two of the plurality of conductive patches, identify a round trip time (RTT) and an angle of arrival (AoA) of the received signal. The wireless communication circuit may be configured to determine a location of the external device, based on the identified RTT and AoA.

An electronic device according to various embodiments of the disclosure disclosed herein may include: a plurality of conductive patches 1500 including the first conductive patch 1510, the second conductive patch 1520 disposed to be spaced apart from the first conductive patch 1510 along a first axis, and the third conductive patch 1530 disposed to be spaced apart from the second conductive patch 1520 along a second axis; and the wireless communication circuit 360 positioned in a direction crossing between the first conductive patch 1510 and the third conductive patch 1530 from the second conductive patch 1520. The first conductive patch 1510 may have a quadrangular shape. The first conductive patch may include the first edge 1511 facing the second conductive patch 1520, a second edge 1512 perpendicularly meeting the first edge 1511 at a first corner 1510a, and a third edge 1513 perpendicularly meeting the first edge 1511 at the second corner 1510b, and include the first slit structure 1430. The first slit structure 1430 may include a first part extending, by a first length L1, from a first point adjacent to the first corner 1510a in a first direction diagonal to the first corner 1510a, a second part extending, by the first length L1, from a second point adjacent to the first corner 1410a in the first direction, and a third part connecting the first part and the second part. The second conductive patch 1520 and the third conductive patch 1530 may each have a shape substantially identical to that of the first conductive patch 1510 and may be disposed to be rotated by 180 degrees with respect to the first conductive patch 1510. The wireless communication circuit 360 may be configured to feed power to the first edge 1511 of the first conductive patch 1510, a fourth edge 1514 of the second conductive patch 1520 facing the first edge 1511, and a fifth edge of the third conductive patch 1530, which is relatively adjacent to the first conductive patch 310 and corresponds to the fourth edge 1514, among edges of the third conductive patch 330 parallel to the fourth edge 1514. The wireless communication circuit may be configured to transmit and/or receive a signal having a first frequency band through linearly polarized waves generated in an identical direction and circularly polarized waves generated in an identical direction from each of the plurality of conductive patches 1500 according to the feeding.

According to an embodiment of the disclosure, the first conductive patch may further include a second slit structure. The second slit structure may include a fourth part extending, by a second length smaller than the first length, from a third point adjacent to the second corner in a second direction diagonal to the second corner. The second slit structure may include a fifth part extending, by the second length, from a fourth point adjacent to the second corner in the second direction, and a sixth part connecting the fourth part and the fifth part.

According to an embodiment of the disclosure, the first slit structure may include: a fourth part lengthily extending along the first edge and connecting to the first part; and a fifth part lengthily extending along the second edge and connecting to the second part.

According to an embodiment of the disclosure, the circularly polarized wave may correspond to right-handed circular polarization (RHCP) or left-handed circular polarization (LHCP).

According to an embodiment of the disclosure, the first slit structure may be U-shaped.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a plurality of conductive patches comprising a first conductive patch, a second conductive patch disposed to be spaced apart from the first conductive patch along a first axis, and a third conductive patch disposed to be spaced apart from the second conductive patch along a second axis,
   wherein the first conductive patch:
      comprises a first edge facing the second conductive patch, a second edge perpendicularly meeting the first edge at a first corner, a third edge parallel to the first edge, and a fourth edge that is parallel to the second edge and perpendicularly meets the third edge at a second corner, has a first width in a first direction from the first corner to the second corner, and has a second width smaller than the first width in a second direction perpendicular to the first direction, and wherein each of the second conductive patch and the third conductive patch having a shape substantially identical to a shape of the first conductive patch; and a wireless communication circuit positioned in a direction between the first conductive patch and the third conductive patch from the second conductive patch, wherein the wireless communication circuit is configured to:

feed power to a first point of the first edge of the first conductive patch, a second point of a fifth edge of the second conductive patch facing the first edge, and a third point of a sixth edge of the third conductive patch relatively adjacent to the first conductive patch among edges of the third conductive patch parallel to the fifth edge, and transmit and/or receive a signal having a first frequency band through linearly polarized waves generated in an identical direction and circularly polarized waves generated in an identical direction in each of the plurality of conductive patches according to feeding.

2. The electronic device of claim 1, wherein the linearly polarized wave comprises a first linearly polarized wave parallel to the first direction and a second linearly polarized wave parallel to the second direction which are generated from each of the plurality of conductive patches according to the feeding, and wherein the circularly polarized wave is based on the first linearly polarized wave and the second linearly polarized wave.

3. The electronic device of claim 2, wherein a signal having the first linearly polarized wave corresponds to a second frequency band, wherein a signal having the second linearly polarized wave corresponds to a third frequency band, and wherein the first frequency band corresponds to a frequency band in which the second frequency band and the third frequency band overlap with each other.

4. The electronic device of claim 1, wherein the first frequency band comprises a frequency band of 6.7-6.75 gigahertz (GHz).

5. The electronic device of claim 1, wherein the first axis in which the first conductive patch and the second conductive patch are arranged and the second axis in which the second conductive patch and the third conductive patch are arranged are substantially perpendicular to each other.

6. The electronic device of claim 1, wherein the first conductive patch and the second conductive patch are spaced a first gap apart from each other, and wherein the second conductive patch and the third conductive patch are spaced a second gap apart from each other.

7. The electronic device of claim 1, wherein the circularly polarized wave corresponds to right-handed circular polarization (RHCP) or left-handed circular polarization (LHCP).

8. The electronic device of claim 1, wherein the wireless communication circuit is electrically connected to the plurality of conductive patches through a micro strip.

9. The electronic device of claim 1, wherein the plurality of conductive patches are arranged toward a rear surface of the electronic device.

10. The electronic device of claim 1, wherein the second conductive patch has a third width in the first direction and a fourth width smaller than the third width in the second direction, and wherein the third conductive patch has a fifth width in the first direction and a sixth width smaller than the fifth width in the second direction.

11. The electronic device of claim 1, wherein the first conductive patch further comprises:

a seventh edge extending from one end of the first edge in the second direction and meeting one end of the fourth edge; and an eighth edge extending from one end of the second edge in the second direction and meeting one end of the third edge.

12. The electronic device of claim 1, wherein the first conductive patch further comprises:

a seventh edge connecting the first edge and the fourth edge, and an eighth edge connecting the second edge and the third edge, wherein the seventh edge comprises:

a first part extending from one end of the first edge toward the third edge, and a second part extending from the first part toward the fourth edge and meeting the fourth edge, and wherein the eighth edge comprises:

a third part extending from one end of the second edge toward the fourth edge, and a fourth part extending from the third part toward the second edge and meeting the second edge.

13. The electronic device of claim 1, further comprising:

a flexible printed circuit board (FPCB) on which the plurality of conductive patches are arranged.

14. The electronic device of claim 13, wherein the FPCB comprises:

a first layer on which the plurality of conductive patches are arranged; and a second layer including a ground.

15. The electronic device of claim 1, wherein the wireless communication circuit is configured to:

based on a signal received from an external device by using at least two of the plurality of conductive patches, identify a round trip time (RTT) and an angle of arrival (AoA) of the received signal, and determine a location of the external device, based on the identified RTT and AoA.

16. An electronic device comprising:

a plurality of conductive patches comprising:

a first conductive patch, a second conductive patch disposed to be spaced apart from the first conductive patch along a first axis, and a third conductive patch disposed to be spaced apart from the second conductive patch along a second axis, wherein the first conductive patch has a quadrangular shape, wherein the first conductive patch comprises:

a first edge facing the second conductive patch, a second edge perpendicularly meeting the first edge at a first corner, and a third edge perpendicularly meeting the first edge at a second corner, wherein the first conductive patch comprises a first slit structure, the first slit structure comprising:

a first part extending, by a first length, from a first point adjacent to the first corner in a first direction diagonal to the first corner, a second part extending, by the first length, from a second point adjacent to the first corner in the first direction, and a third part connecting the first part and the second part, wherein each of the second conductive patch and the third conductive patch has a shape substantially identical to a shape of the first conductive patch and being disposed to be rotated by 180 degrees with respect to the first conductive patch, wherein a wireless communication circuit positioned in a direction between the first conductive patch and the third conductive patch from the second conductive patch, and wherein the wireless communication circuit is configured to:

feed power to the first edge of the first conductive patch, a fourth edge of the second conductive patch facing the first edge, and a fifth edge of the third conductive patch relatively adjacent to the first conductive patch among edges of the third conductive patch parallel to the fourth edge, and transmit and/or receive a signal having a first frequency band through linearly polarized waves generated in an identical direction and circularly polarized waves generated in an identical direction from each of the plurality of conductive patches according to feeding.

17. The electronic device of claim 16, wherein the first conductive patch further comprises a second slit structure, and wherein the second slit structure comprises:

a fourth part extending, by a second length smaller than the first length, from a third point adjacent to the second corner in a second direction diagonal to the second corner, a fifth part extending, by the second length, from a fourth point adjacent to the second corner in the second direction, and a sixth part connecting the fourth part and the fifth part.

18. The electronic device of claim 16, wherein the first slit structure comprises:

a fourth part lengthily extending along the first edge and connecting to the first part; and a fifth part lengthily extending along the second edge and connecting to the second part.

19. The electronic device of claim 16, wherein the circularly polarized wave corresponds to right-handed circular polarization (RHCP) or left-handed circular polarization (LHCP).

20. The electronic device of claim 16, wherein the first slit structure is U-shaped.

* * * * *